(12) United States Patent
Lipton et al.

(10) Patent No.: US 7,424,175 B2
(45) Date of Patent: *Sep. 9, 2008

(54) VIDEO SEGMENTATION USING STATISTICAL PIXEL MODELING

(75) Inventors: Alan J. Lipton, Herndon, VA (US); Niels Haering, Reston, VA (US); Zeeshan Rasheed, Sterling, VA (US); Omar Javed, Herndon, VA (US); Zhong Zhang, Herndon, VA (US); Weihong Yin, Herndon, VA (US); Péter L. Venetianer, McLean, VA (US); Gary W. Myers, Aldie, VA (US)

(73) Assignee: ObjectVideo, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/711,063

(22) Filed: Feb. 27, 2007

(65) Prior Publication Data

US 2007/0160289 A1    Jul. 12, 2007

Related U.S. Application Data

(63) Continuation-in-part of application No. 10/667,148, filed on Sep. 22, 2003, now Pat. No. 7,224,852, which is a continuation-in-part of application No. 09/815,385, filed on Mar. 23, 2001, now Pat. No. 6,625,310.

(60) Provisional application No. 60/792,313, filed on Apr. 17, 2006.

(51) Int. Cl.
*G06K 9/32* (2006.01)
*H04N 7/18* (2006.01)
*G06K 9/36* (2006.01)

(52) U.S. Cl. ............................ 382/294; 375/240.11

(58) Field of Classification Search ............... 382/103, 382/173, 181, 224, 232, 233, 260–264, 276, 382/294; 375/240.01, 240.11, 240.12, 240.16, 375/240.19, 240.29, 343, 350, E7.035; 348/143, 348/224.1, 239, 270, 290, 699–702; 340/541, 340/539.25, 572.1
See application file for complete search history.

(56) References Cited

U.S. PATENT DOCUMENTS

| 4,764,971 A | 8/1988 | Sullivan |
| 4,949,389 A | 8/1990 | Allebach et al. |
| 5,048,095 A | 9/1991 | Bhanu et al. |
| 5,448,651 A | 9/1995 | Sakou et al. |
| 5,519,789 A | 5/1996 | Etoh |

(Continued)

OTHER PUBLICATIONS

U.S. Appl. No. 09/472,162, filed Dec. 27, 1999, Strat.

(Continued)

*Primary Examiner*—Amir Alavi
(74) *Attorney, Agent, or Firm*—Venable LLP; Michael A. Sartori; Kyle D. Petaja

(57) ABSTRACT

A method for segmenting video data into foreground and background portions utilizes statistical modeling of the pixels. A statistical model of the background is built for each pixel, and each pixel in an incoming video frame is compared with the background statistical model for that pixel. Pixels are determined to be foreground or background based on the comparisons. The method for segmenting video data may be further incorporated into a method for implementing an intelligent video surveillance system. The method for segmenting video data may be implemented in hardware.

19 Claims, 19 Drawing Sheets

U.S. PATENT DOCUMENTS

| | | |
|---|---|---|
| 5,586,200 A | 12/1996 | Devaney et al. |
| 5,671,294 A | 9/1997 | Rogers et al. |
| 5,696,551 A | 12/1997 | Katto |
| 5,724,456 A | 3/1998 | Boyack et al. |
| 5,764,306 A | 6/1998 | Steffano |
| 5,768,413 A | 6/1998 | Levin et al. |
| 5,802,203 A | 9/1998 | Black et al. |
| 5,875,305 A | 2/1999 | Winter et al. |
| 5,969,755 A | 10/1999 | Courtney |
| 5,990,955 A | 11/1999 | Koz |
| 6,008,865 A | 12/1999 | Fogel |
| 6,049,363 A | 4/2000 | Courtney et al. |
| 6,058,210 A | 5/2000 | de Queiroz et al. |
| 6,078,619 A | 6/2000 | Monro et al. |
| 6,084,912 A * | 7/2000 | Reitmeier et al. ...... 375/240.11 |
| 6,195,458 B1 | 2/2001 | Warnick et al. |
| 6,249,613 B1 | 6/2001 | Crinon et al. |
| 6,278,466 B1 | 8/2001 | Chen |
| 6,337,917 B1 | 1/2002 | Onural et al. |
| 6,349,113 B1 | 2/2002 | Mech et al. |
| 6,393,054 B1 | 5/2002 | Altunbasak et al. |
| 6,396,876 B1 | 5/2002 | Babonneau et al. |
| 6,404,925 B1 | 6/2002 | Foote et al. |
| 6,625,310 B2 | 9/2003 | Lipton et al. |
| 6,658,136 B1 | 12/2003 | Brumitt |
| 6,738,424 B1 | 5/2004 | Allmen et al. |
| 6,930,689 B1 | 8/2005 | Giacalone et al. |
| 6,987,451 B2 | 1/2006 | McKeown et al. |
| 2002/0063154 A1 | 5/2002 | Hoyos et al. |
| 2004/0151374 A1 | 8/2004 | Lipton et al. |
| 2004/0240546 A1 | 12/2004 | Wells |
| 2005/0169367 A1 | 8/2005 | Venetianer et al. |
| 2006/0066722 A1 | 3/2006 | Yin et al. |
| 2006/0222209 A1 | 10/2006 | Zhang et al. |
| 2006/0268111 A1 | 11/2006 | Zhang et al. |

OTHER PUBLICATIONS

U.S. Appl. No. 11/288,200, filed Nov. 29, 2005, Venetianer.
U.S. Appl. No. 11/139,986, filed May 31, 2005, Zhang.

* cited by examiner

VIDEO SEGMENTATION USING STATISTICAL PIXEL MODELING

CROSS-REFERENCE TO RELATED APPLICATION

This application claims priority to the following, all of which are incorporated herein by reference in their entirety: co-pending U.S. Provisional Patent Application No. 60/792,313, filed Apr. 17, 2006; co-pending and commonly-assigned U.S. patent application Ser. No. 10/667,148, filed Sep. 22, 2003 now U.S. Pat. No. 7,224,852 B2; and commonly-assigned U.S. patent application Ser. No. 09/815,385, filed on Mar. 23, 2001, now U.S. Pat. No. 6,625,310. This application is a continuation-in-part of co-pending U.S. patent application Ser. No. 10/667,148, which is a continuation-in-part of U.S. patent application Ser. No. 09/815,385, now U.S. Pat. No. 6,625,310.

FIELD OF THE INVENTION

The present invention relates to processing of video frames for use in video processing systems, for example, intelligent video surveillance (IVS) systems that are used as a part of or in conjunction with Closed Circuit Television Systems (CCTV) that are utilized in security, surveillance and related homeland security and anti-terrorism systems, IVS systems that process surveillance video in retail establishments for the purposes of establishing in-store human behavior trends for market research purposes, IVS systems that monitor vehicular traffic to detect wrong-way traffic, broken-down vehicles, accidents and road blockages, and video compression systems. IVS systems are systems that further process video after video segmentation steps to perform object classification in which foreground objects may be classified as a general class such as animal, vehicle, or other moving but-unclassified object, or may be classified in more specific classes as human, small- or large- non-human animal, automobile, aircraft, boat, truck, tree, flag, or water region. In IVS systems, once such video segmentation and classification occurs, then detected objects are processed to determine how their positions, movements and behaviors relate to user defined virtual video tripwires, and virtual regions of interest (where a region of interest may be an entire field of view, or scene). User defined events that occur will then be flagged as events of interest that will be communicated to the security officer or professional on duty. Examples of such events include a human or a vehicle crossing a virtual video tripwire, a person or vehicle loitering or entering a virtual region of interest or scene, or an object being left behind or taken away from a virtual region or scene. In particular, the present invention deals with ways of segmenting video frames into their component parts using statistical properties of regions comprising the video frames.

BACKGROUND OF THE INVENTION

In object-based video compression, video segmentation for detecting and tracking video objects, as well as in other types of object-oriented video processing, the input video is separated into two streams. One stream contains the information representing stationary background information, and the other stream contains information representing the moving portions of the video, to be denoted as foreground information. The background information is represented as a background model, including a scene model, i.e., a composite image composed from a series of related images, as, for example, one would find in a sequence of video frames; the background model may also contain additional models and modeling information. Scene models are generated by aligning images (for example, by matching points and/or regions) and determining overlap among them; generation of scene models is discussed in further depth in commonly-assigned U.S. patent application Ser. No. 09/472,162, filed Dec. 27, 1999, and Ser. No. 09/609,919, filed Jul. 3, 2000, both incorporated by reference in their entireties herein. In an efficient transmission or storage scheme, the scene model need be transmitted only once, while the foreground information is transmitted for each frame. For example, in the case of an observer (i.e., camera or the like, which is the source of the video) that undergoes only pan, tilt, roll, and zoom types of motion, the scene model need be transmitted only once because the appearance of the scene model does not change from frame to frame, except in a well-defined way based on the observer motion, which can be easily accounted for by transmitting motion parameters. Note that such techniques are also applicable in the case of other forms of motion, besides pan, tilt, roll, and zoom. In IVS systems, the creation of distinct moving foreground and background objects allows the system to attempt classification on the moving objects of interest, even when the background pixels may be undergoing apparent motion due to pan, tilt and zoom motion of the camera.

To make automatic object-oriented video processing feasible, it is necessary to be able to distinguish the regions in the video sequence that are moving or changing and to separate (i.e., segment) them from the stationary background regions. This segmentation must be performed in the presence of apparent motion, for example, as would be induced by a panning, tilting, rolling, and/or zooming observer (or due to other motion-related phenomena, including actual observer motion). To account for this motion, images are first aligned; that is, corresponding locations in the images (i.e., frames) are determined, as discussed above. After this alignment, objects that are truly moving or changing, relative to the stationary background, can be segmented from the stationary objects in the scene. The stationary regions are then used to create (or to update) the scene model, and the moving foreground objects are identified for each frame.

It is not an easy thing to identify and automatically distinguish between video objects that are moving foreground and stationary background, particularly in the presence of observer motion, as discussed above. Furthermore, to provide the maximum degree of compression or the maximum fineness or accuracy of other video processing techniques, it is desirable to segment foreground objects as finely as possible; this enables, for example, the maintenance of smoothness between successive video frames and crispness within individual frames. Known techniques have proven, however, to be difficult to utilize and inaccurate for small foreground objects and have required excessive processing power and memory. It would, therefore, be desirable to have a technique that permits accurate segmentation between the foreground and background information and accurate, crisp representations of the foreground objects, without the limitations of prior techniques.

SUMMARY OF THE INVENTION

The present invention is directed to a method for segmentation of video into foreground information and background information, based on statistical properties of the source video. More particularly, the method is based on creating and updating statistical information pertaining to a characteristic of regions of the video and the labeling of those regions (i.e., as foreground or background) based on the statistical information. For example, in one embodiment, the regions are pixels, and the characteristic is chromatic intensity. Many other possibilities exist, as will become apparent. In more particular embodiments, the invention is directed to methods of using the inventive video segmentation methods to implement intelligent video surveillance systems.

In embodiments of the invention, a background model is developed containing at least two components. A first component is the scene model, which may be built and updated, for example, as discussed in the aforementioned U.S. patent applications. A second component is a background statistical model.

In a first embodiment, the inventive method comprises a two-pass process of video segmentation. The two passes of the embodiment comprise a first pass in which a background statistical model is built and updated and a second pass in which regions in the frames are segmented. An embodiment of the first pass comprises steps of aligning each video frame with a scene model and updating the background statistical model based on the aligned frame data. An embodiment of the second pass comprises, for each frame, steps of labeling regions of the frame and performing spatial filtering.

In a second embodiment, the inventive method comprises a one-pass process of video segmentation. The single pass comprises, for each frame in a frame sequence of a video stream, steps of aligning the frame with a scene model; building a background statistical model; labeling the regions of the frame, and performing spatial/temporal filtering.

In yet another embodiment, the inventive method comprises a modified version of the aforementioned one-pass process of video segmentation. This embodiment is similar to the previous embodiment, except that the step of building a background statistical model is replaced with a step of building a background statistical model and a secondary statistical model.

In a fourth embodiment, the inventive method comprises a one-pass process of video segmentation. The single pass comprises, for each frame in a real-time video stream, steps of labeling the pixels in the frame, performing spatial/temporal filtering of the pixels in the frame, optionally refining the pixel labeling, building/updating background and foreground statistical model(s); and inserting objects into the background statistical model.

Each of these embodiments may be embodied in the forms of a computer system running software executing their steps and a computer-readable medium containing software representing their steps.

Each of these embodiments may be embodied in the form of a hardware apparatus.

DEFINITIONS

In describing the invention, the following definitions are applicable throughout (including above).

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, like a CD-ROM or a DVD; a magnetic tape; and a memory chip.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

"Video" refers to motion pictures represented in analog and/or digital form. Examples of video include video feeds from CCTV systems in security, surveillance and anti-terrorism applications, television, movies, image sequences from a camera or other observer, and computer-generated image sequences. These can be obtained from, for example, a wired or wireless live feed, a storage device, a firewire interface, a video digitizer, a video streaming server, device or software component, a computer graphics engine, or a network connection.

"Video processing" refers to any manipulation of video, including, for example, compression and editing.

A "frame" refers to a particular image or other discrete unit within a video.

A "video camera" may refer to an apparatus for visual recording. Examples of a video camera may include one or more of the following: a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

BRIEF DESCRIPTION OF THE DRAWINGS

The invention will now be described in further detail in connection with the attached drawings, in which.

Note that identical objects are labeled with the same reference numerals in all of the drawings that contain them.

DETAILED DESCRIPTION OF THE INVENTION

As discussed above, the present invention is directed to the segmentation of video streams into foreground information, which corresponds to moving objects, and background information, which corresponds to the stationary portions of the video. The present invention may be embodied in a number of ways, of which four specific ones are discussed below. These embodiments are meant to be exemplary, rather than exclusive.

The ensuing discussion refers to "pixels" and "chromatic intensity;" however, the inventive method is not so limited. Rather, the processing may involve any type of region (including regions comprising multiple pixels), not just a pixel, and may use any type of characteristic measured with respect to or related to such a region, not just chromatic intensity.

1. FIRST EMBODIMENT

Two-Pass Segmentation

Figure 1:
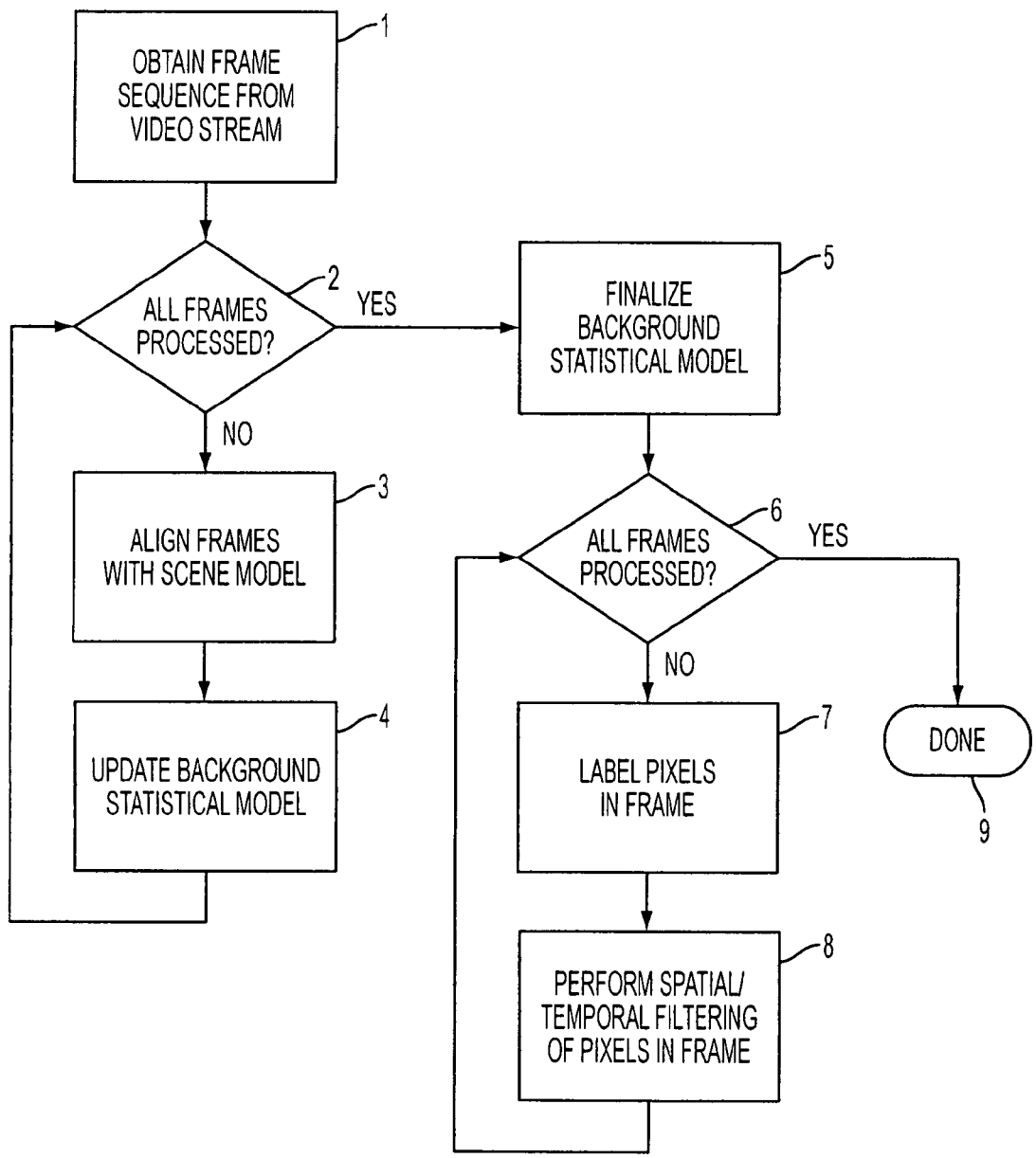
FIG. 1 shows a flowchart corresponding to an implementation of a first embodiment of the invention.

The first embodiment of the invention is depicted in FIG. 1 and corresponds to a two-pass method of segmentation. As shown in FIG. 1, the method begins by obtaining a frame (or video) sequence from a video stream (Step 1). The frame sequence preferably includes two or more frames of the video stream. The frame sequence can be, for example, a portion of the video stream or the entire video stream. As a portion of the video stream, the frame sequence can be, for example, one continuous sequence of frames of the video stream or two or more discontinuous sequences of frames of the video stream. As part of the alignment step, the scene model is also built and updated.

After Step 1, in Step 2, it is determined whether or not all frames have yet been processed. If not, the next frame is taken and aligned with the underlying scene model of the video stream (Step 3); such alignment is discussed above, and more detailed discussions of alignment techniques may be found, for example, in commonly-assigned U.S. patent application Ser. No. 09/472,162, filed Dec. 27, 1999, and Ser. No. 09/609,919, filed Jul. 3, 2000, both incorporated by reference in their entireties herein, as discussed above, as well as in numerous other references.

The inventive method is based on the use of statistical modeling to determine whether a particular pixel should be classified as being a foreground object or a part thereof or as being the background or a part thereof. Step 4 deals with the building and updating of a statistical model of the background, using each frame aligned in Step 3.

The statistical model of the present invention comprises first- and second-order statistics. In the ensuing discussion, mean and standard deviation will be used as such first- and second-order statistics; however, this is meant to be merely exemplary of the statistics that may be used.

In general, the mean of N samples, $\bar{x}$, is computed by taking the sum of the samples and dividing it by N, i.e., $$\bar{x} = \frac{\sum_{i=1}^{N} x_i}{N}, \quad (1)$$

where $x_i$ is a particular sample corresponding to a given pixel (or region), which in the present case could be, for example, the measured chromatic intensity of the $i^{th}$ sample corresponding to the given pixel (or region). In the present setting, then, such a mean would be computed for each pixel or region.

While Eqn. (1) gives the general formula for a sample mean, it may not always be optimal to use this formula. In video processing applications, a pixel's sample value may change drastically when an object moves through the pixel and change (drastically) back to a value around its previous value after the moving object is no longer within that pixel. In order to address this type of consideration, the invention utilizes a weighted average, in which the prior values are weighted more heavily than the present value. In particular, the following equation may be used:

$$\bar{x}_N = W_p \bar{x}_{N-1} + W_n x_N, \quad (2)$$

where $W_p$ is the weight of the past values and $W_n$ is the weight assigned to the newest value. Additionally, $\bar{x}_J$ represents the weighted average taken over J samples, and $x_K$ represents the $K^{th}$ sample. $W_p$ and $W_n$ may be set to any pair of values between zero and one such that their sum is one and such that $W_n < W_p$, so as to guarantee that the past values are more heavily weighted than the newest value. As an example, the inventors have successfully used $W_p = 0.9$ and $W_n = 0.1$.

Standard deviation, $\sigma$, is determined as the square root of the variance, $\sigma^2$, of the values under consideration. In general, variance is determined by the following formula:

$$\sigma^2 = \overline{x^2} - (\bar{x})^2, \quad (3)$$

where $\overline{x^2}$ represents the average of $x^2$; thus, the standard deviation is given by $$\sigma = \sqrt{\overline{x^2} - (\bar{x})^2}. \quad (4)$$

Because the inventive method uses running statistics, this becomes $$\sigma_N = \sqrt{\{\overline{x^2}\}_N - (\bar{x}_N)^2}, \quad (4a)$$

where $\bar{x}_N$ is as defined in Eqn. (2) above, and $\{\overline{x^2}\}_N$ is defined as the weighted average of the squared values of the samples, through the $N^{th}$ sample, and is given by $$\{\overline{x^2}\}_N = W_p \{\overline{x^2}\}_{N-1} + W_n x_N^2. \quad (5)$$

As in the case of the weighted average of the sample values, the weights are used to assure that past values are more heavily weighted than the present value.

Given this, Step 4 works to create and update the statistical model by computing the value of Eqn. (4a) for each pixel, for each frame. In Step 4, the values for the pixels are also stored on a pixel-by-pixel basis (as opposed to how they are received, i.e., on a frame-by-frame basis); that is, an array of values is compiled for each pixel over the sequence of frames. Note that in an alternative embodiment, Step 4 only performs this storage of values.

Following Step 4, the method returns to Step 2 to check whether or not all of the frames have been processed. If they have, then the method proceeds to Step 5, which commences the second pass of the embodiment.

In Step 5, the statistical background model is finalized. This is done by using the stored values for each pixel and determining their mode, the mode being the value that occurs most often. This may be accomplished, for example, by taking a histogram of the stored values and selecting the value for which the histogram has the highest value. The mode of each pixel is then assigned as the value of the background statistical model for that pixel.

Following Step 5, the method proceeds to Step 6, which determines whether or not all of the frames have been processed yet. If not, then the method proceeds to Step 7, in which each pixel in the frame is labeled as being a foreground (FG) pixel or a background (BG) pixel. Two alternative embodiments of the workings of this step are shown in the flowcharts of FIGS. 2a and 2b.

Figure 2A:
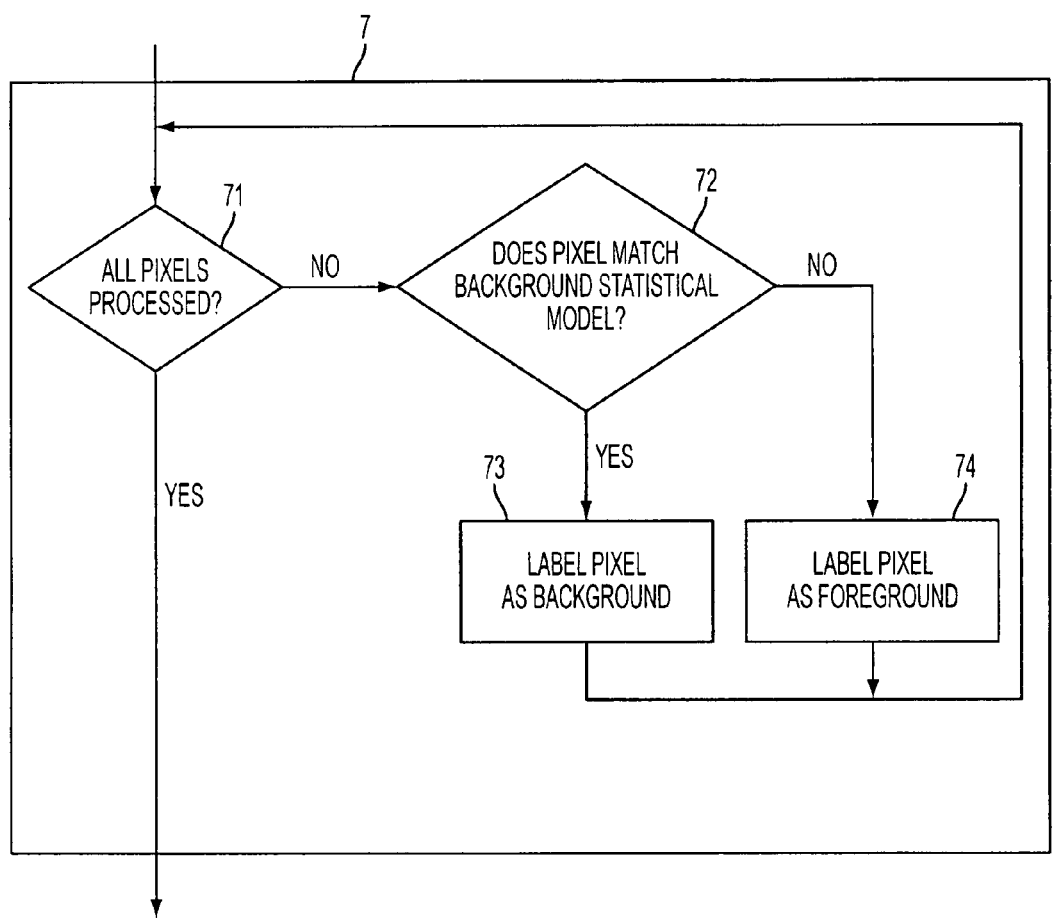
FIGS. 2a and 2b show flowcharts corresponding to two alternative embodiments of the labeling step in the flowchart of FIG. 1.
Figure 2B:
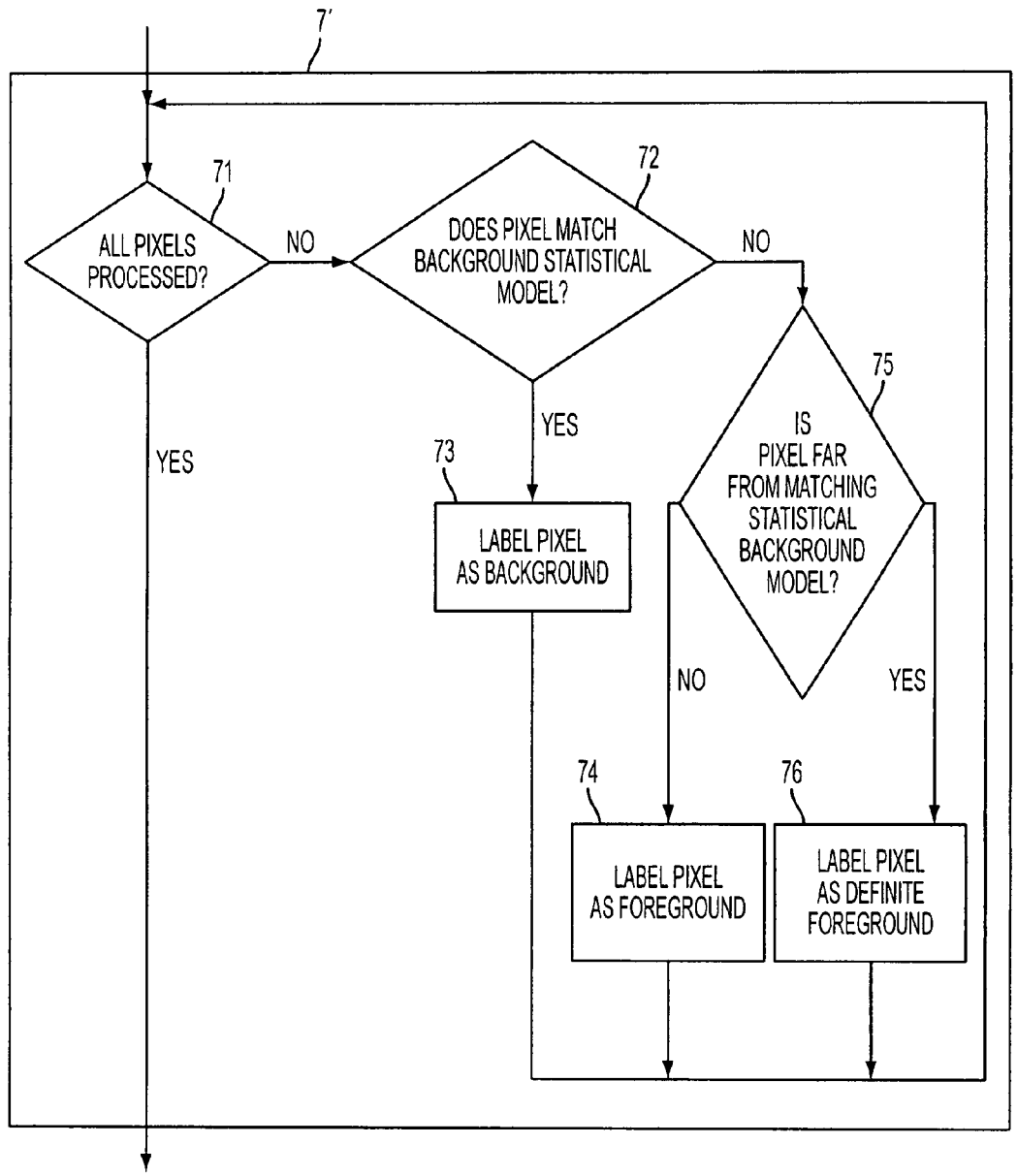

FIG. 2a depicts a two decision level method. In FIG. 2a, the pixel labeling Step 7 begins with Step 71, where it is determined whether or not all of the pixels in the frame have been processed. If not, then the method proceeds to Step 72 to examine the next pixel. Step 72 determines whether or not the pixel matches the background statistical model, i.e., whether the value of the pixel matches the model for that pixel. This is performed by taking the absolute difference between the pixel value and the value of the background statistical model for the pixel (i.e., the mode) and comparing it with a threshold; that is, $$\Delta = |x_{pixel} - m_{pixel}| \quad (6)$$

is compared with a threshold $\theta$. In Eqn. (6), $x_{pixel}$ denotes the value of the pixel, while $m_{pixel}$ represents the value of the statistical background model for that pixel.

The threshold $\theta$ may be determined in many ways. For example, it may be taken to be a function of standard deviation (of the given pixel), $\sigma$. In a particular exemplary embodiment, $\theta = 3\sigma$; in another embodiment, $\theta = K\sigma$, where K is chosen by the user. As another example, $\theta$ may be assigned a predetermined value (again, for each pixel) or one chosen by the user.

If $\Delta \leq \theta$, then the pixel value is considered to match the background statistical model. In this case, the pixel is labeled as background (BG) in Step 73, and the algorithm proceeds back to Step 71. Otherwise, if $\Delta > \theta$, then the pixel value is considered not to match the background statistical model, and the pixel is labeled as foreground (FG) in Step 74. Again, the algorithm then proceeds back to Step 71. If Step 71 determines that all of the pixels (in the frame) have been processed, then Step 7 is finished.

FIG. 2b depicts a three decision level method, labeled 7'. In FIG. 2b, the process once again begins with Step 71, a step of determining whether or not all pixels have yet been processed. If not, the process considers the next pixel to be processed and executes Step 72, the step of determining whether or not the pixel being processed matches the background statistical model; this is done in the same way as in FIG. 2a. If yes, then the pixel is labeled as BG (Step 73), and the process loops back to Step 71. If not, then the process proceeds to Step 75; this is where the process of FIG. 2b is distinguished from that of FIG. 2a.

In Step 75, the process determines whether or not the pixel under consideration is far from matching the background statistical model. This is accomplished via a threshold test similar to Step 72, only in Step 75, $\theta$ is given a larger value. As in Step 72, $\theta$ may be user-assigned or predetermined. In one embodiment, $\theta = N\sigma$, where N is a either a predetermined or user-set number, N>K. In another embodiment, N=6.

If the result of Step 75 is that $\Delta < \theta$, then the pixel is labeled as FG (Step 74). If not, then the pixel is labeled definite foreground (DFG), in Step 76. In each case, the process loops back to Step 71. Once Step 71 determines that all pixels in the frame have been processed, Step 7' is complete.

Returning to FIG. 1, once all of the pixels of a frame have been labeled, the process proceeds to Step 8, in which spatial/temporal filtering is performed. While shown as a sequential step in FIG. 1, Step 8 may alternatively be performed in parallel with Step 7. Details of Step 8 are shown in the flowcharts of FIGS. 3a and 3b.

Figure 3A:
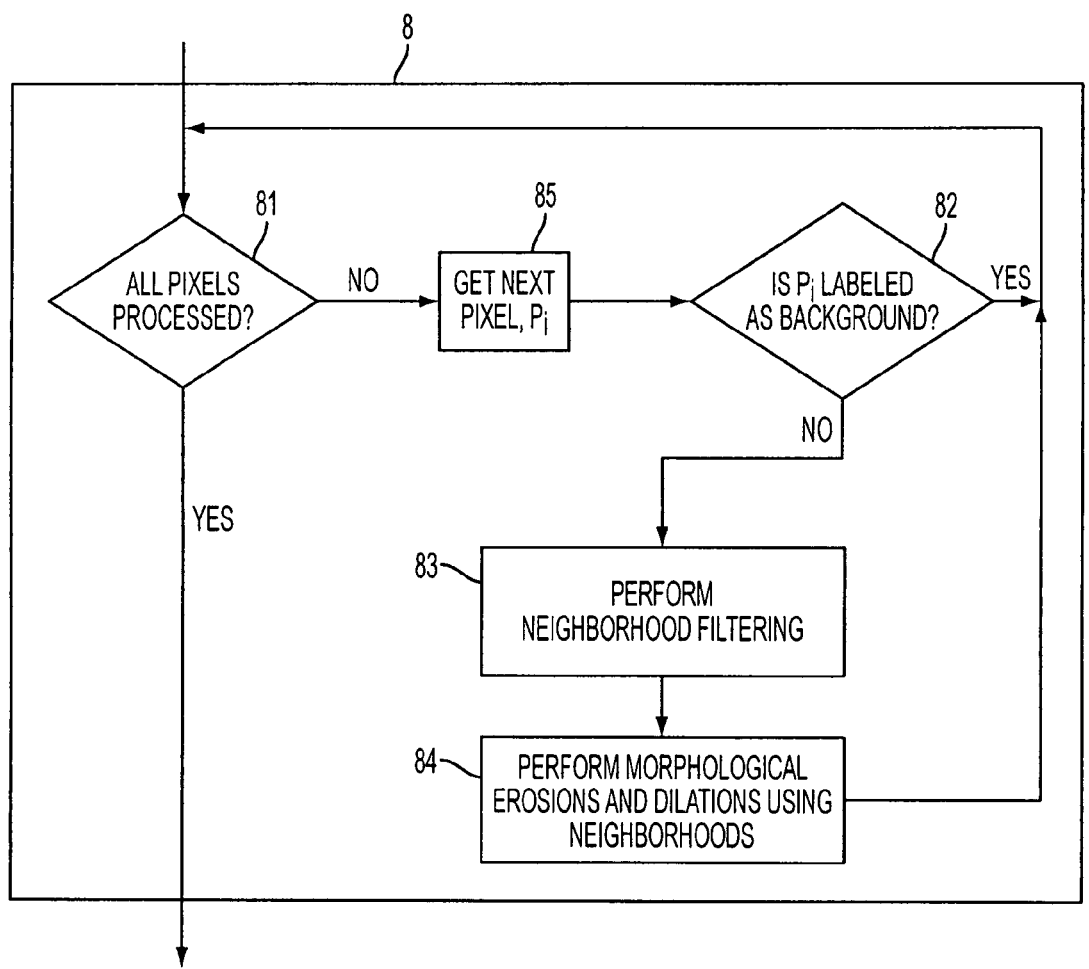
FIG. 3a and 3b show flowcharts corresponding to implementations of the spatial/temporal filtering step in the flowchart of FIG. 1.

In FIG. 3a, Step 8 commences with a test as to whether or not all the pixels of the frame have been processed (Step 81). If not, in Step 85, the algorithm selects the next pixel, $P_i$, for processing and proceeds to Step 82, where it is determined whether or not the pixel is labeled as BG. If it is, then the process goes back to Step 81. If not, then the pixel undergoes further processing in Steps 83 and 84.

Step 83, neighborhood filtering, is used to correct for misalignments when the images are aligned. If the current image is slightly misaligned with the growing background statistical model, then, particularly near strong edges, the inventive segmentation procedure, using the background statistical model, will label pixels as foreground. Neighborhood filtering will correct for this. An embodiment of Step 83 is depicted in the flowchart of FIG. 3b.

Figure 3B:
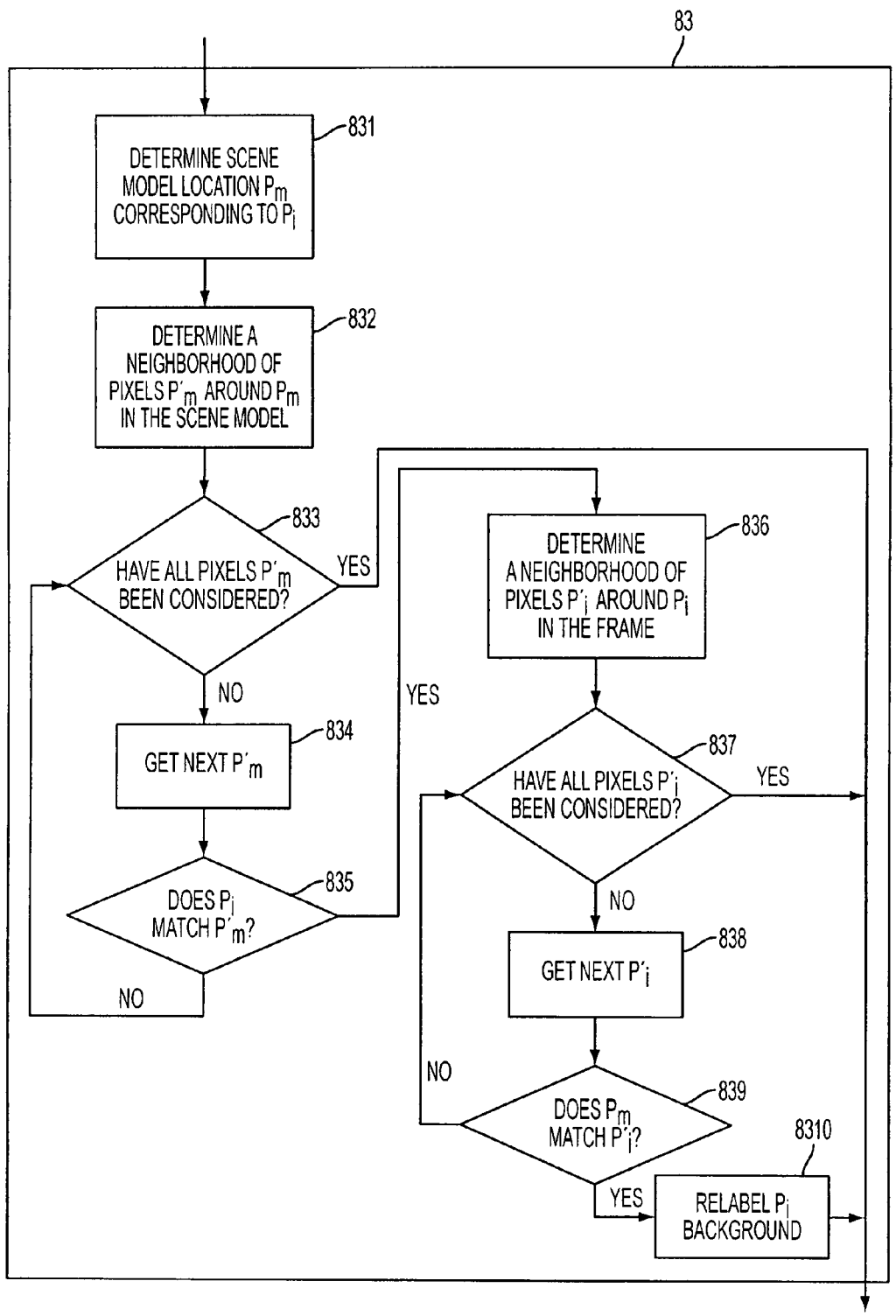

In FIG. 3b, Step 83 begins with Step 831, where a determination is made of the scene model location, $P_m$, corresponding to $P_i$. Next, a neighborhood, comprising the pixels, $P'_m$, surrounding $P_m$ in the scene model, is selected (Step 832). Step 833 next determines if all of the pixels in the neighborhood have been processed. If yes, Step 83 is complete, and the label of $P_i$ remains as it was; if not, the process proceeds to Step 834, where the next neighborhood pixel $P'_m$ is considered. Step 835 then tests to determine whether or not $P_i$ matches $P'_m$. This matching test is accomplished by executing the labeling step (Step 7 or 7') in a modified fashion, using $P_i$ as the pixel under consideration and $P'_m$ as the "corresponding" background statistical model point. If the labeling step returns a label of FG or DFG, there is no match, whereas if it returns a label of BG, there is a match. If there is no match, the process loops back to Step 833; if there is a match, then this is an indication that $P_i$ might be mislabeled, and the process continues to Step 836. In Step 836, a neighborhood, comprising the pixels, $P'_i$, surrounding $P_i$ in the frame, is selected, and an analogous process is performed. That is, in Step 833, it is determined whether or not all of the pixels, P'$_i$ in the neighborhood have yet been considered. If yes, then Step 83 is complete, and the label of P$_i$ remains as it was; if not, then the process proceeds to Step 838, where the next neighborhood pixel, P'$_i$, is considered. Step 839 tests to determine if P$_m$ matches P'$_i$; this is performed analogously to Step 833, with the P'$_i$ under consideration being used as the pixel being considered and P$_m$ as its "corresponding" background statistical model point. If it does not, then the process loops back to Step 837; if it does, then P$_i$ is relabeled as BG, and Step 83 is complete.

Returning to FIG. 3a, following Step 83, Step 84 is executed, in which morphological erosions and dilations are performed. First, a predetermined number, n, of erosions are performed to remove incorrectly labeled foreground. Note that pixels labeled DFG may not be eroded because they represent either a pixel that is almost certainly foreground. This is followed by n dilations, which restore the pixels that were correctly labeled as foreground but were eroded. Finally, a second predetermined number, m, of dilations are performed to fill in holes in foreground objects. The erosions and dilations may be performed using conventional erosion and dilation techniques, applied in accordance with user-specified parameters, and modified, as discussed above, such that pixels labeled DFG are not eroded.

In alternative embodiments, Step 84 may comprise filtering techniques other than or in addition to morphological erosions and dilations. In general, Step 84 may employ any form or forms of spatial and/or temporal filtering.

Returning to FIG. 1, following Step 8, the algorithm returns to Step 6, to determine whether or not all frames have been processed. If yes, then the processing of the frame sequence is complete, and the process ends (Step 9).

This two-pass embodiment has the advantage of relative simplicity, and it is an acceptable approach for applications not requiring immediate or low-latency processing. Examples of such applications include off-line video compression and non-linear video editing and forensic processing of security and surveillance video. On the other hand, many other applications such as video security and surveillance in which timely event reporting is critical do have such requirements, and the embodiments to be discussed below are tailored to address these requirements.

2. SECOND EMBODIMENT

One-Pass Segmentation

Figure 4:
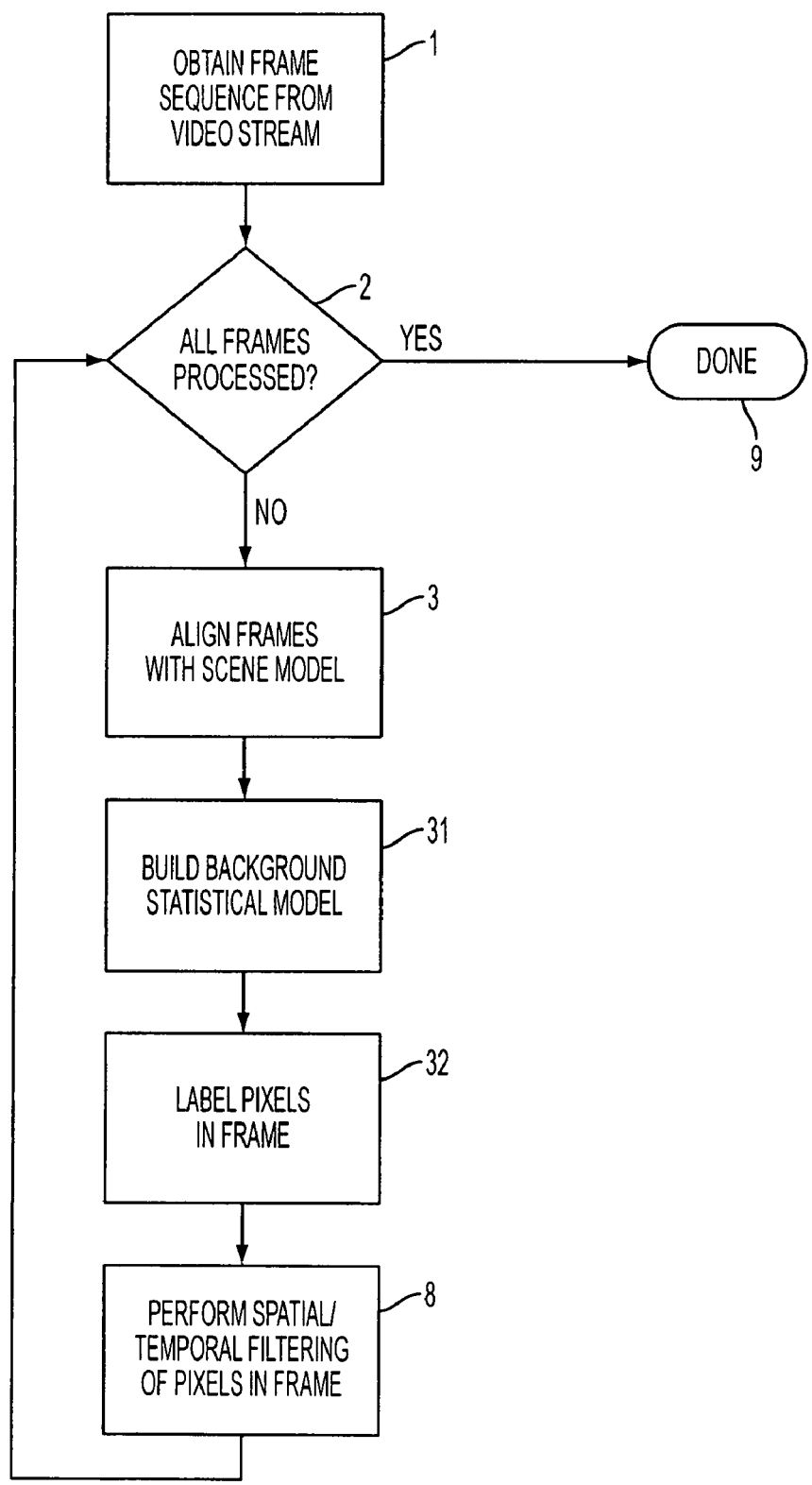
FIG. 4 shows a flowchart corresponding to an implementation of a second embodiment of the invention.

FIG. 4 depicts a flowchart of a one-pass segmentation process, according to a second embodiment of the invention. Comparing FIG. 4 with FIG. 1 (the first embodiment), the second embodiment differs in that there is only a single pass of processing for each frame sequence. This single pass, as shown in Steps 2, 3, 31, 32, 8 in FIG. 4, incorporates the processes of the second pass (Steps 5-8 in FIG. 1) with the first pass (Steps 2-4 in FIG. 1), albeit in a modified form, as will be discussed below.

As in the case of the first embodiment, the second embodiment (one-pass process), shown in FIG. 4, begins by obtaining a frame sequence (Step 1). As in the first embodiment, the process then performs a test to determine whether or not all of the frames have yet been processed (Step 2). Also as in the first embodiment, if the answer is no, then the next frame to be processed is aligned with the scene model (Step 3). As discussed above, the scene model component of the background model is built and updated as part of Step 3, so there is always at least a deterministically-determined value in the background model at each location.

At this point, the process includes a step of building a background statistical model (Step 31). This differs from Step 4 of FIG. 1, and is depicted in further detail in FIG. 5. The process begins with a step of determining whether or not all pixels in the frame being processed have been processed (Step 311). If not, then the process determines whether or not the background statistical model is "mature" (Step 312) and "stable" (Step 313).

The reason for Steps 312 and 313 is that, initially, the statistical background model will not be sufficiently developed to make accurate decisions as to the nature of pixels. To overcome this, some number of frames should be processed before pixels are labeled (i.e., the background statistical model should be "mature"); in one embodiment of the present invention, this is a user-defined parameter. This may be implemented as a "look-ahead" procedure, in which a limited number of frames are used to accumulate the background statistical model prior to pixel labeling (Step 32 in FIG. 4).

While simply processing a user-defined number of frames may suffice to provide a mature statistical model, stability is a second concern (Step 313), and it depends upon the standard deviation of the background statistical model. In particular, as will be discussed below, the statistical background model includes a standard deviation for each pixel. The statistical model (for a particular pixel) is defined as having become "stable" when its variance (or, equivalently, its standard deviation) is reasonably small. In an embodiment of the present invention, Step 313 determines this by comparing the standard deviation with a user-defined threshold parameter; if the standard deviation is less than this threshold, then the statistical background model (for that pixel) is determined to be stable.

Figure 5:
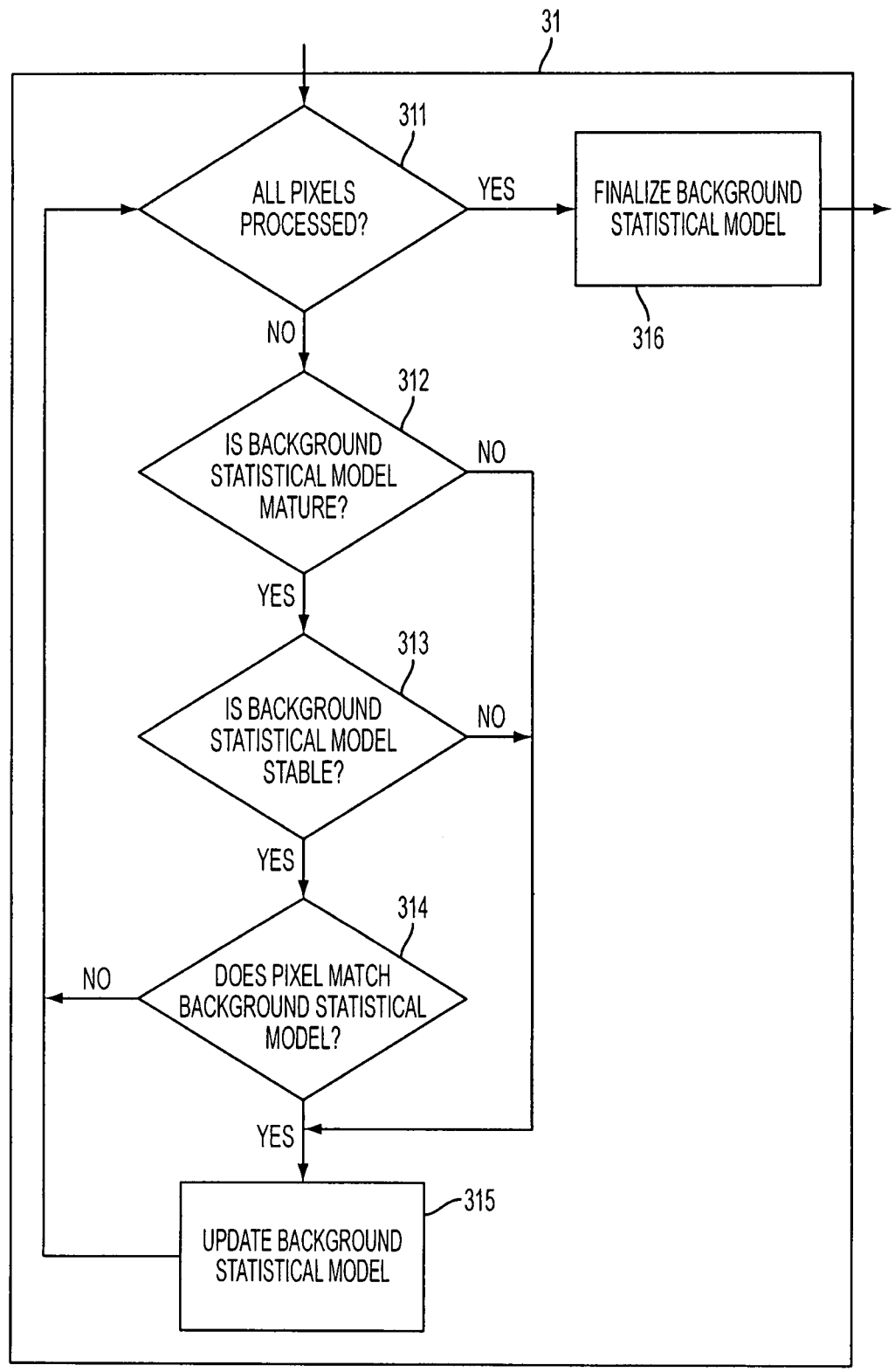
FIG. 5 shows a flowchart corresponding to an implementation of one of the steps in the flowchart of FIG. 4.

As to the flow of Step 31, in FIG. 5, if the background statistical model is determined to be mature (Step 312), it is determined whether or not the background statistical model is stable (Step 313). If either of these tests (Steps 312 and 313) fails, the process proceeds to Step 315, in which the background statistical model of the pixel being processed is updated using the current value of that pixel. Step 315 will be explained further below.

If the background statistical model is determined to be both mature and stable (in Steps 312 and 313), the process proceeds to Step 314, where it is determined whether or not the pixel being processed matches the background statistical model. If yes, then the background statistical model is updated using the current pixel value (Step 315); if no, then the process loops back to Step 311 to determine if all pixels in the frame have been processed.

Step 314 operates by determining whether or not the current pixel value is within some range of the mean value of the pixel, according to the current background statistical model. In one embodiment of the invention, the range is a user-defined range. In yet another embodiment, it is determined to be a user-defined number of standard deviations; i.e., the pixel value, x, matches the background statistical model if $$|x_{pixel} - \overline{x_{pixel}}| \leq K\sigma, \tag{7}$$

where K is the user-defined number of standard deviations, $\sigma$; $x_{pixel}$ is the current pixel value; and $\overline{x_{pixel}}$ is the mean value of the current pixel in the background statistical model. The purpose of performing Step 314 is to ensure, to the extent possible, that only background pixels are used to develop and update the background statistical model.

In Step 315, the background statistical model is updated. In this embodiment, the background statistical model consists of the mean and standard deviation of the values for each pixel (over the sequence of frames). These are computed according to Eqns. (2) and (4a) above.

Following Step 315, the process loops back to Step 311, to determine if all pixels (in the current frame) have been processed. Once all of the pixels have been processed, the process proceeds to Step 316, where the background statistical model is finalized. This finalization consists of assigning to each pixel its current mean value and standard deviation (i.e., the result of processing all of the frames up to that point).

Note that it is possible for the background statistical model for a given pixel never to stabilize. This generally indicates that the particular pixel is not a background pixel in the sequence of frames, and there is, therefore, no need to assign it a value for the purposes of the background statistical model. Noting that, as discussed above, a scene model is also built and updated, there is always at least a deterministically-determined value associated with each pixel in the background model.

Following Step 316, the process goes to Step 32, as shown in FIG. 4, where the pixels in the frame are labeled according to their type (i.e., definite foreground, foreground or background). Step 32 is shown in further detail in the flowchart of FIGS. 6a and 6b.

The following concepts are embodied in the description of Step 32 to follow. Ideally, labeling would always be done by testing each pixel against its corresponding point in the background statistical model, but this is not always possible. If the background statistical model is not ready to use on the basis of number of frames processed (i.e., "mature"), then the process must fall back on testing against the corresponding point in the scene model. If the background statistical model is ready to use but has not yet settled down (i.e., is not "stable"), this is a sign that the pixel is varying and should be labeled as being foreground. If the background statistical model has, for some reason (i.e., because it fails to match the scene model or because it has become unsettled again), become unusable, the process must once again fall back on testing against the scene model.

Figure 6A:
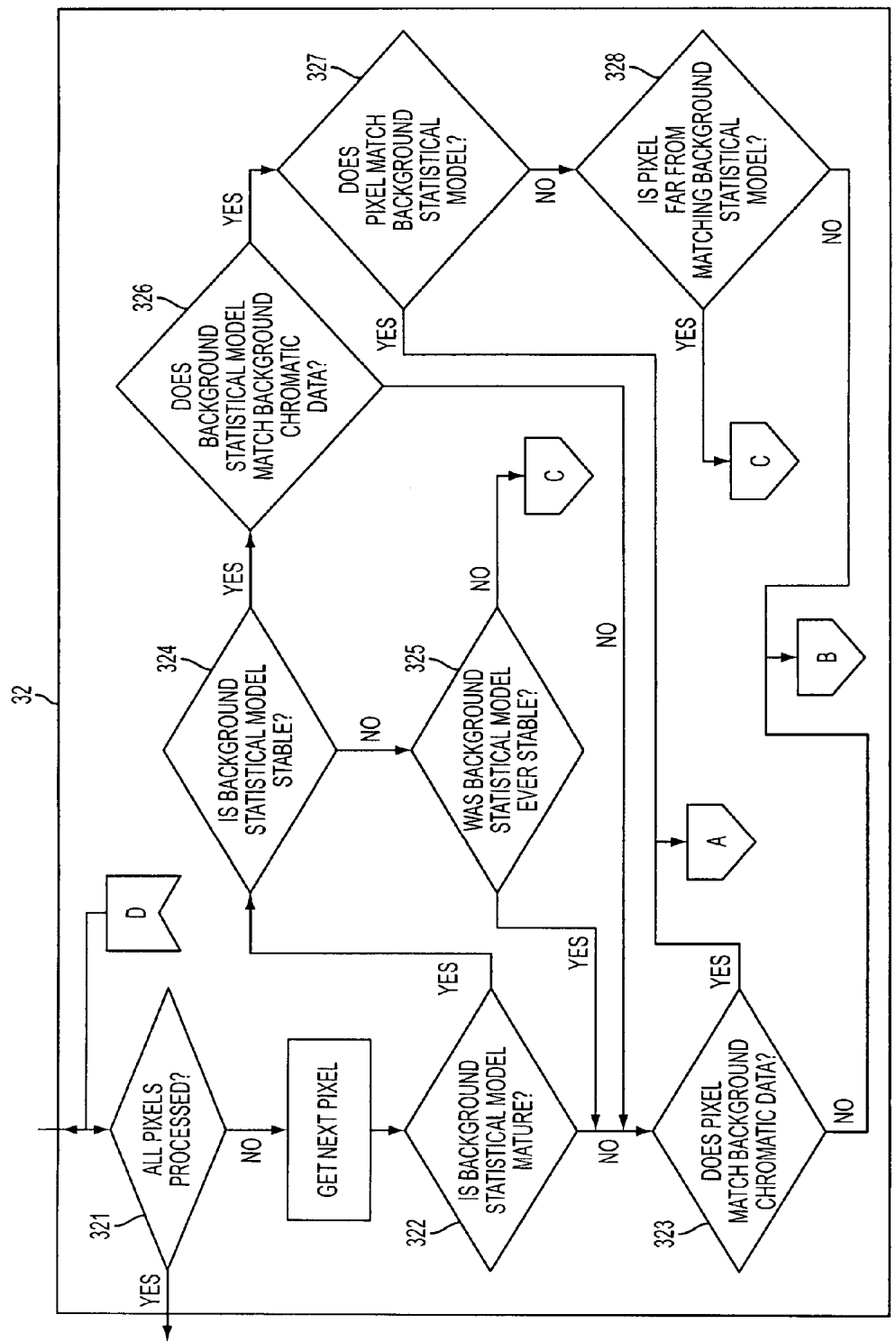
FIGS. 6a and 6b together show a flowchart corresponding to an implementation of another one of the steps in the flowchart of FIG. 4.

As shown in FIG. 6a, Step 32 begins with Step 321, where it is determined whether or not all pixels (in the current frame) have been processed. If yes, Step 32 is complete; if not, the next pixel is processed in Steps 322 et seq.

Step 322 determines whether or not the background statistical model is mature. This is done in the same manner as in Step 312 of FIG. 5, discussed above. If not, the process proceeds to Step 323, where it is determined whether or not the pixel matches the background chromatic data of the corresponding point of the scene model.

Step 323 is performed by carrying out a test to determine whether or not the given pixel falls within some range of the background chromatic data value. This is analogous to Step 314 of FIG. 5, substituting the background chromatic data value for the statistical mean. The threshold may be determined in a similar fashion (predetermined, user-determined, or the like).

Figure 6B:
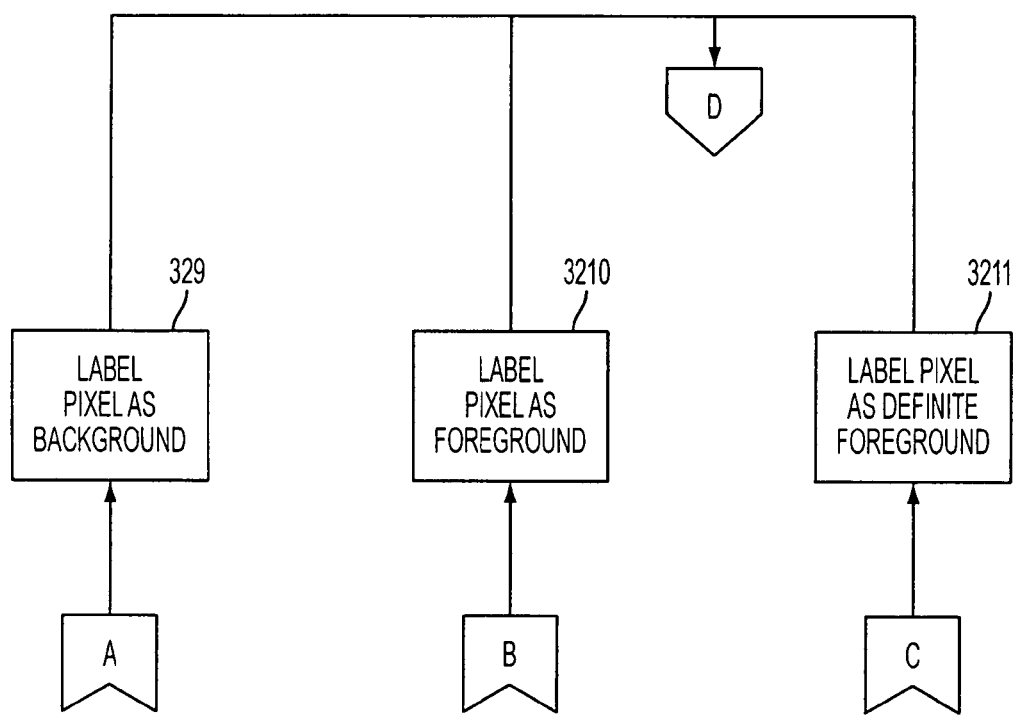

If Step 323 determines that the pixel does match the background chromatic data, then the pixel is labeled BG (following connector A) in Step 329 of FIG. 6b. From Step 329, the process loops back (via connector D) to Step 321.

If Step 323 determines that the pixel does not match the background chromatic data, then the pixel is labeled FG (following connector B) in Step 3210 of FIG. 6b. From the Step 3210, the process loops back (via connector D) to Step 321.

If Step 322 determines that the background statistical model is mature, processing proceeds to Step 324, which determines whether or not the background statistical model is stable. Step 324 performs this task in the same manner as Step 313 of FIG. 5, discussed above. If not, the process proceeds to Step 325, where it is determined if the background statistical model was ever stable (i.e., if it was once stable but is now unstable). If yes, then the process branches to Step 323, and the process proceeds from there as described above. If no, the pixel is labeled DFG (following connector C) in Step 3211 of FIG. 6b, after which the process loops back (via connector D) to Step 321.

If Step 324 determines that the background statistical model is stable, the process goes to Step 326. Step 326 tests whether the background statistical model matches the background chromatic data. Similar to the previous matching tests above, this test takes an absolute difference between the value of the background statistical model (i.e., the mean) for the pixel and the background chromatic data (i.e., of the scene model) for the pixel. This absolute difference is then compared to some threshold value, as above (predetermined, user-determined, or the like).

If Step 326 determines that there is not a match between the background statistical model and the background chromatic data, the process branches to Step 323, where processing proceeds in the same fashion as described above. If Step 326, on the other hand, determines that there is a match, the process continues to Step 327.

Step 327 determines whether or not the current pixel matches the background statistical model. This step is performed in the same manner as Step 314 of FIG. 5, discussed above. If the current pixel does match (which, as discussed above, is determined by comparing it to the mean value corresponding to the current pixel), the pixel is labeled BG (following connector A) in Step 329 of FIG. 6b, and the process then loops back (via connector D) to Step 321. If not, then further testing is performed in Step 328.

Step 328 determines whether, given that the current pixel value does not reflect a BG pixel, it reflects a FG pixel or a DFG pixel. This is done by determining if the pixel value is far from matching the background statistical model. As discussed above, a FG pixel is distinguished from a BG pixel (in Step 325) by determining if its value differs from the mean by more than a particular amount, for example, a number of standard deviations (see Eqn. (7)). Step 328 applies the same test, but using a larger range. Again, the threshold may set as a predetermined parameter, as a computed parameter, or as a user-defined parameter, and it may be given in terms of a number of standard deviations from the mean, i.e., $$|x_{pixel} - \overline{x_{pixel}}| \leq N\sigma, \quad (8)$$

where N is a number greater than K of Eqn. (7). If the pixel value lies outside the range defined, for example, by Eqn. (8), it is labeled DFG (following connector C) in Step 3211 of FIG. 6b, and the process loops back (via connector D) to Step 321. If it lies within the range, the pixel is labeled FG (following connector B) in Step 3210 of FIG. 6b, and the process proceeds (via connector D) to Step 321.

After Step 32 is complete, the process proceeds to Step 8, as shown in FIG. 4, where spatial/temporal filtering is performed on the pixels in the frame. Step 8 is implemented, in this embodiment of the invention, in the same manner as that in which it is implemented for the two-pass embodiment, except that the pixel labeling algorithm of FIGS. 6a and 6b is used for Steps 833 and 837 of Step 83 (as opposed to the pixel labeling algorithms used in the two-pass embodiment). Following Step 8, the process loops back to Step 2, where, if all frames have been processed, the process ends.

A single-pass approach, like the one present here, has the advantage of not requiring a second pass, thus, reducing the latency associated with the process. This is useful for applications in which high latencies would be detrimental, for example, video teleconferencing, webcasting, real-time gaming, and the like.

3. THIRD EMBODIMENT

Modified One-Pass Segmentation

While the one-pass approach described above has a lower latency than the two-pass approach, it does have a disadvantage in regard to the background statistical model. In particular, the cumulative statistical modeling approach used in the one-pass embodiment of the invention may stabilize on a non-representative statistical model for an element (i.e., pixel, region, etc.; that is, whatever size element is under consideration). If the values (e.g., chromatic values) of frame elements corresponding to a particular element of the video scene fundamentally change (i.e., something happens to change the video, for example, a parked car driving away, a moving car parking, the lighting changes, etc.), then the scene model element will no longer accurately represent the true scene. This can be addressed by utilizing a mechanism for dynamically updating the background statistical model so that at any given time it accurately represents the true nature of the scene depicted in the video. Such a mechanism is depicted in the embodiment of the invention shown in FIG. 7.

Figure 7:
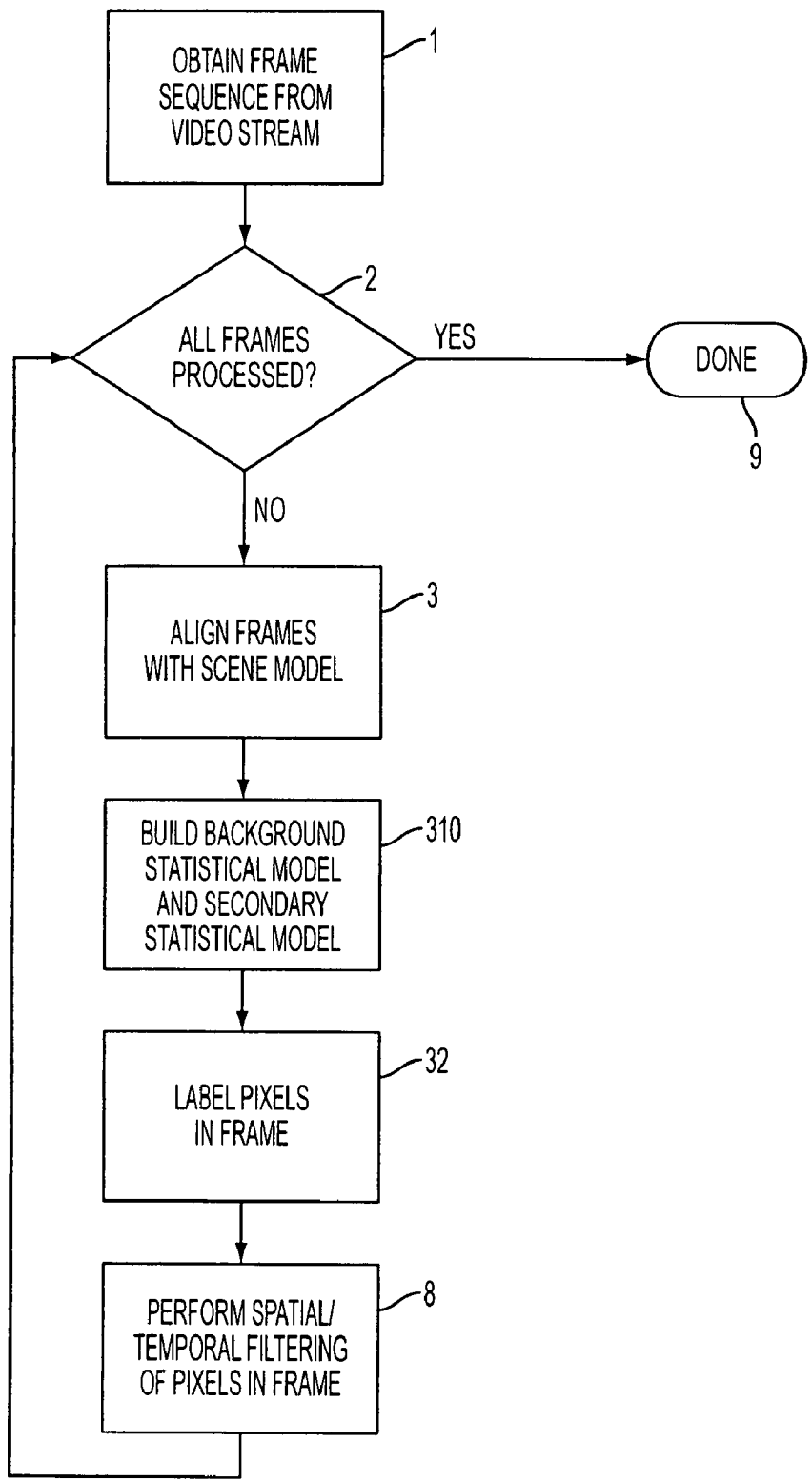
FIG. 7 shows a flowchart corresponding to an implementation of a third embodiment of the invention.

In FIG. 7, Steps 1-3, 32, 8, and 9 are as described in the one-pass embodiment above. The embodiment of FIG. 7 differs from that of FIG. 4 in that after a given frame is aligned with the scene model (Step 3), the process executes Step 310, in which the background statistical model and, simultaneously, a secondary background statistical model are built. Step 310 is more fully described in connection with FIGS. 8a and 8b.

Figure 8A:
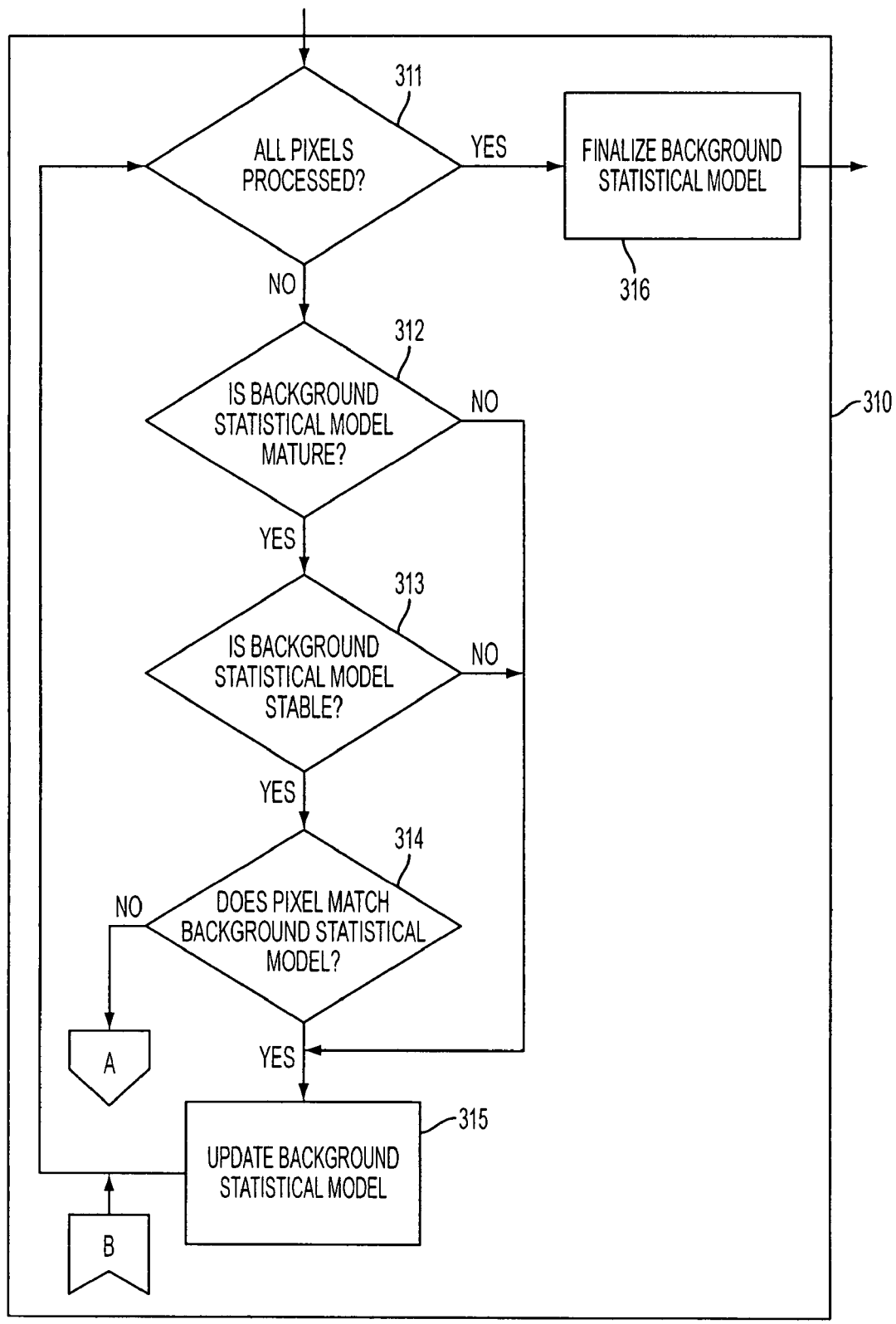
FIGS. 8a and 8b together show a flowchart corresponding to an implementation of one of the steps in the flowchart of FIG. 7.
Figure 8B:
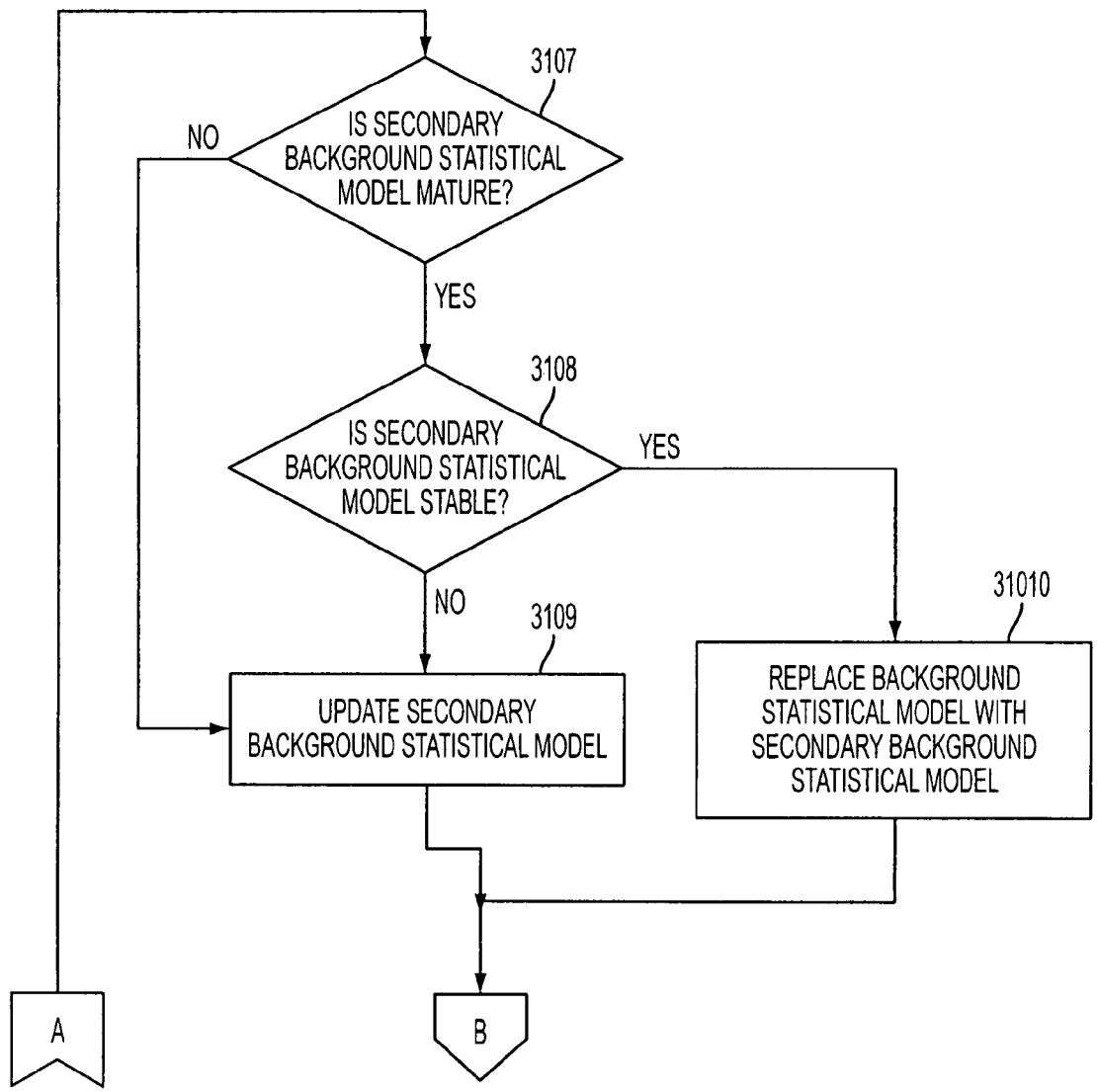

As shown in FIG. 8a, Step 310 includes all of the steps shown in Step 31 in FIG. 5 (which are shown using the same reference numerals), and it begins with a step of determining whether or not all pixels have yet been processed (Step 311). If not, the next pixel is processed by proceeding to Step 312. In Step 312, it is determined whether or not the background statistical model is mature. If not, the process branches to Step 315, where the pixel is used to update the background statistical model. Following Step 315, the process loops back to Step 311.

If Step 312 determines that the background statistical model is mature, the process proceeds to Step 313, where it is determined whether or not the background statistical model is stable. If it is not, then, as in the case of a negative determination in Step 312, the process branches to Step 315 (and then loops back to Step 311). Otherwise, the process proceeds to Step 314.

In Step 314, it is determined whether or not the pixel under consideration matches the background statistical model. If it does, the process proceeds with Step 315 (and then loops back to Step 311); otherwise, the process executes the steps shown in FIG. 8b, which build and update a secondary background statistical model. This secondary background statistical model is built in parallel with the background statistical model, as reflected in FIG. 8b; uses the same procedures as are used to build and update the background statistical model; and represents the pixel values that do not match the background statistical model.

Following a negative determination in Step 314, the process then makes a determination as to whether or not the secondary background statistical model is mature (Step 3107). This determination is made in the same fashion as in Step 313. If not, the process branches to Step 3109, where the secondary background statistical model is updated, using the same procedures as for the background statistical model (Step 315). From Step 3109, the process loops back to Step 311 (in FIG. 8a).

If Step 3107 determines that the secondary background statistical model is mature, the process proceeds to Step 3108, which determines (using the same procedures as in Step 314) whether or not the secondary background statistical model is stable. If not, the process proceeds to Step 3109 (and from there to Step 311). If yes, then the process branches to Step 31010, in which the background statistical model is replaced with the secondary background statistical model, after which the process loops back to Step 311. Additionally, concurrently with the replacement of the background statistical model by the secondary background statistical model in Step 31010, the scene model data is replaced with the mean value of the secondary statistical model. At this point, the secondary background statistical model is reset to zero, and a new one will be built using subsequent data.

This modified one-pass embodiment has the advantage of improved statistical accuracy over the one-pass embodiment, and it solves the potential problem of changing background images. It does this while still maintaining improved latency time over the two-pass embodiment, and at only a negligible decrease in processing speed compared with the one-pass embodiment.

4. FOURTH EMBODIMENT

Real-Time Video Stream One-Pass Segmentation

A focus of the first, second, and third exemplary embodiments is segmentation for compression applications. For compression applications, the idea is to keep a statistical background model representing a video sequence or a section of a video sequence. Thus, the idea is to create a background model and then keep the background model constant for a period of time while segmenting a video sequence.

In surveillance applications, processing is generally not performed on a video sequence (i.e., a finite set of video frames), but rather on a real-time video stream (e.g., a continuous set of video frames with no discernable end-point). Consequently, it is, in general, impossible to create a background model to represent the video scene for two reasons. First, the scene is dynamically changing due to lighting conditions and meteorological conditions (e.g., due to rain, shadows, clouds, day/night changes, etc), and second, components in the scene change (e.g., cars are parked, objects are added, removed, or moved within the scene, etc.). To accommodate these conditions in real-time surveillance applications, six modifications to the one-pass algorithm are employed in this embodiment: (1) one or more foreground models are added in addition to the background model(s); (2) the concept of a background or foreground model being "mature" is removed; (3) automatic gain control (AGC) compensation is added; (4) an object insertion mechanism is added; (5) the processing order is different to account for real-time processing requirements; and (6) a masking feature is used to reduce the number of pixels that need to be processed.

As to the six differences, first, foreground model(s) are used in addition to the background model(s) to describe regions that are labeled as foreground. In the third embodiment described above, a secondary background model is used to model a change in the background scene that occurs after the primary background has "matured." In the fourth embodiment, one (or more) foreground models are used to describe pixels (or objects) detected as foreground. The reason for creating one or more foreground models is to cover the case when a foreground object (e.g., a car) stops in a region of the scene. In such a case, it becomes desirable to start treating the foreground object as background for the purpose of object detection (e.g., a car parks, and a person walks in front of the car). Foreground models are created and maintained in exactly the same way as background models, but apply to pixels labeled as "foreground." It is possible to have multiple foreground models to describe multiple objects that occlude each other. For example, a car parks and is modeled by one foreground model. Next, another car parks in front of the first car and is modeled by a second foreground model.

Second, the concept of a model being mature is removed from the fourth embodiment. For this embodiment, in which a video stream rather than a video sequence is processed, it is assumed that the model will not mature and, instead, will continuously and dynamically change to accommodate slow environmental changes such as, for example: the shadows shortening and lengthening as the sun moves; the sun becoming occluded by clouds or coming out from occlusion; rain, snow or fog starting or stopping in the scene; and day and night changes in the scene. In this embodiment, the background model(s) (as well as the foreground models) are continually being modified on a frame-by-frame and pixel-by-pixel basis so that the models best reflect the "current" state of the background rather than on a mature model, which was created previously and may even have been created a long time ago in the past.

Third, AGC compensation is employed in the fourth embodiment. AGC is a process by which video imagers automatically adjust the brightness and contrast of the whole image to try and optimize the dynamic range of the image. The process can take place quite quickly, and can change the intensity of the background pixels so that they appear as foreground pixels when, in fact, there is no foreground object present. Consequently, an AGC compensation component is added to modify the background model in the event of AGC adjustments in the video image Fourth, an object insertion mechanism is added to the fourth embodiment to allow an external signal to control the insertion of objects in the background model. The idea here is that when, for example, a car parks in the scene, there will be a foreground model for all the pixels that represent that car. An external process may determine that these pixels represent a car and that the car has, in fact, parked. Once this determination is made, the external process provides a notification indicating that the foreground model should be added (e.g, "burned in") to the background model. The foreground model is treated as part of the background for the purpose of segmentation.

Fifth, in real-time processing, there is no time to go back and improve pixel labeling after the frame is processed (as is the case in off-line processing or processing with latency). Consequently, the order of steps of the real-time algorithm is different. Initially, when a new frame comes in, the existing background model is used for labeling the pixels. Next, various other processes (such as, for example, spatio-temporal filtering) are used to refine the labeling and, then, the model is updated. This order provides superior segmentation results for each frame in real-time processing.

Sixth, a mask is added in the fourth embodiment to designate pixels to be ignored. The ability is added to set a region of the video image where segmentation should not be applied. A reason for doing this is to conserve processing resources so as to maintain real-time performance. So, if there are areas of a video scene where it is known a priori that no segmentation is required (so-called "areas of disinterest"), these pixels can be masked out. (Alternately, "areas of interest" may be defined.) Further, automated algorithms may be employed to determine these areas of disinterest where there is no need to apply segmentation. Such areas of disinterest may exist because a camera produces various "unused" pixels around the edge of the video frames where there is no real image data. Such. areas of disinterest may also exist in areas of a scene (such as, for example, the sky) where processing is not desired or would not work very well.

Figure 11:
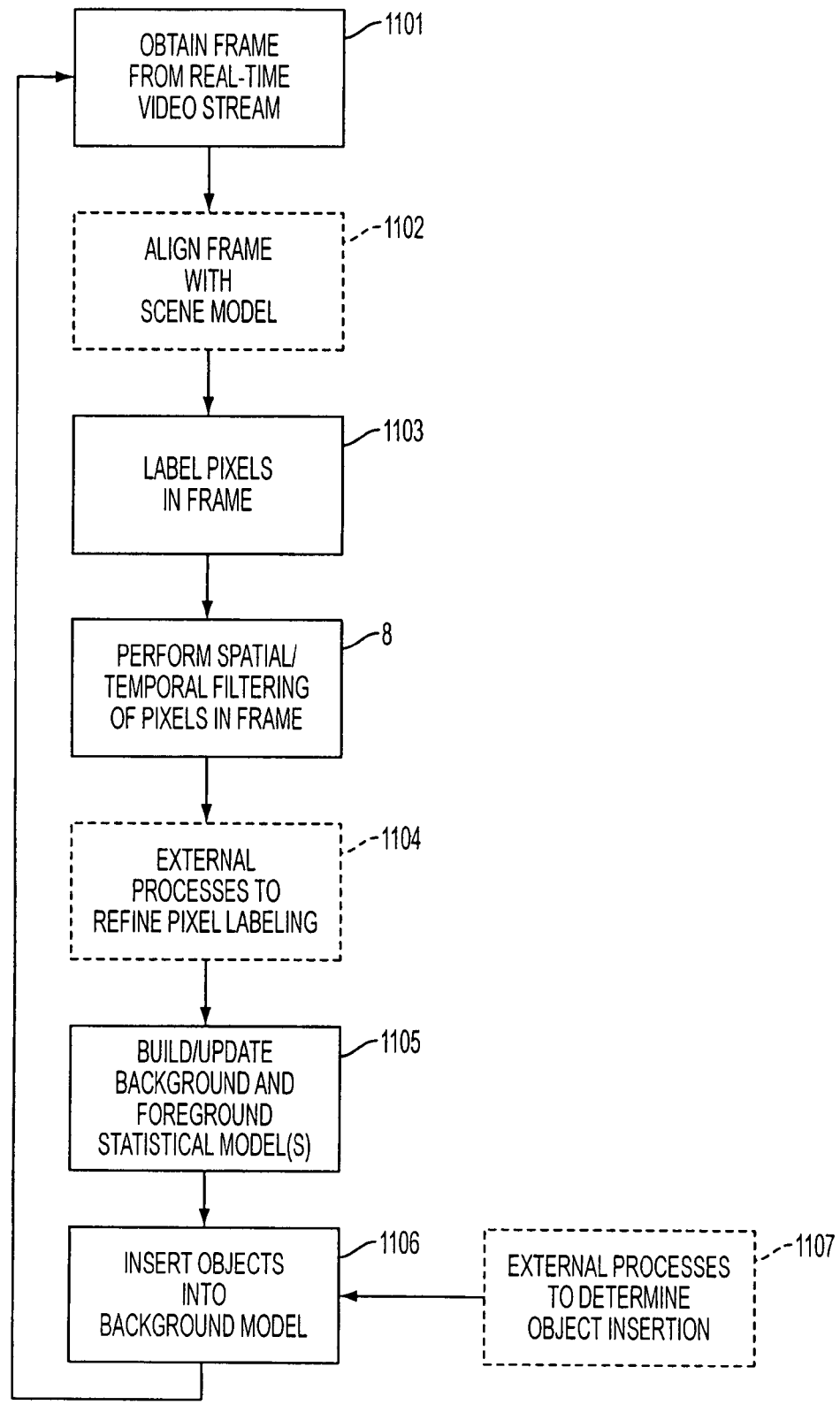
FIG. 11 shows a flowchart corresponding to an implementation of a fourth embodiment of the invention.

FIG. 11 illustrates a flow chart for the exemplary fourth embodiment of the invention. In block 1101, a video frame is extracted from a real-time video stream.

In optional block 1102 (where the optional nature of the block is indicated by the dashed outline), the extracted frame may be aligned with the scene model to accommodate for camera motion (e.g., either jitter or deliberate motion such as pan, tilt, zoom, or translational motion).

In block 1103, each pixel in the frame is labeled as background, foreground, or definite foreground (or more levels of granularity as desired). This constitutes segmentation of a frame into background and foreground components. In one embodiment, the technique discussed with respect to FIG. 2b, which uses the background statistical model, may be used for block 1103. In other embodiments, the background statistical model and/or the foreground statistical models may be used.

In block 8, spatio-temporal filtering is performed on the segmentation to improve the results.

In optional block 1104, additional processes may be included that might bear on or refine the segmentation. For example, object tracking and classification may be included in block 1104. Object tracking and classification are discussed in, for example, U.S. application Ser. No. 11/098,579, filed Apr. 5, 2005, U.S. application Ser. No. 11/139,600, filed May 31, 2005, and U.S. application Ser. No. 11/139,986, filed May 31, 2005, all of which are incorporated herein by reference in their entirety. As another example, stationary target detection may be included in block 1104. Stationary target detection is discussed in, for example, U.S. application Ser. No. 11/288,200, filed Nov. 29, 2005, which is incorporated herein by reference in its entirety.

In block 1105, the segmentation is used to build and/or update the background and foreground statistical models for each pixel.

In block 1106, objects are inserted into the background statistical model. As an option, an external process from block 1107 may decide that the insertion should be performed.

In optional block 1107, a stationary target detector may determine that a certain group, or groups, of pixels represent an object that has moved into the scene and stopped (e.g., a car moves in and parks in the scene). The process may decide that from henceforth these pixels should be treated as background (because it is determined that there is a stopped object at these pixels). Stationary target detection is discussed in, for example, U.S. application Ser. No. 11/288,200, filed Nov. 29, 2005, which is incorporated herein by reference in its entirety.

Figure 12:
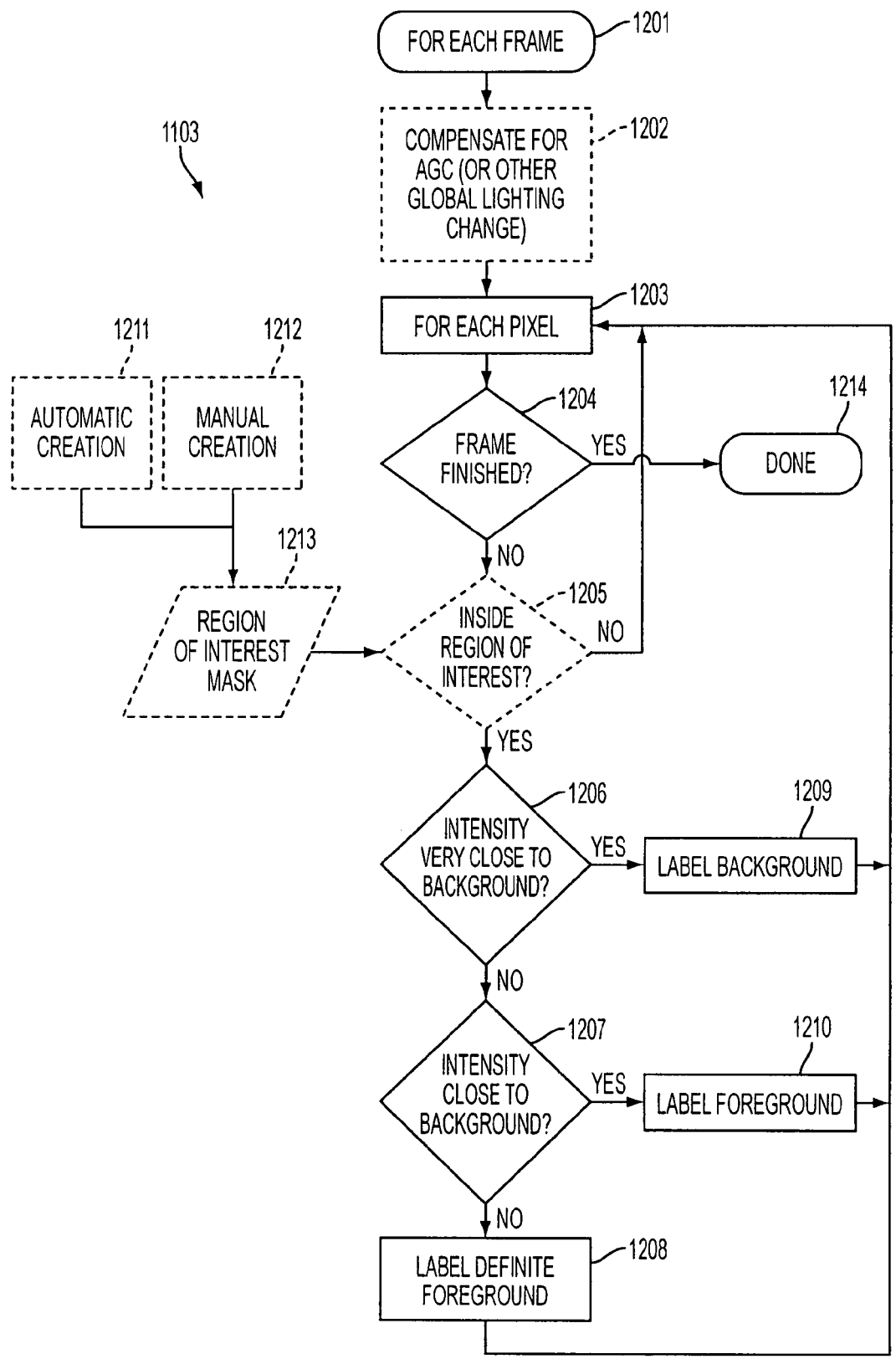
FIG. 12 shows a flowchart corresponding to an implementation of one of the blocks in the flowchart of FIG. 11.

FIG. 12 illustrates a flowchart for block 1103 of FIG. 11. In block 1201, each frame is processed accordingly.

In optional block 1202, compensation for AGC (or other global lighting change) is performed.

In block 1203, each pixel in the frame is processed accordingly.

In block 1204, if each pixel in the frame has been analyzed, flow proceeds to block 1214; otherwise, flow proceeds to block 1205.

In optional block 1205, it is determined whether a pixel is in the area of interest or not. Pixels inside the area of interest are labeled, while pixels outside the area of interest are not labeled. The determination of whether a pixel is inside the area of interest may be performed with a mask (from optional block 1213) or any other such mechanism. The mask may be generated manually (as in optional block 1212), or by an automatic process that determines where the area of interest might be within a frame (as in optional block 1211). The area of interest may be continuous or discontinuous across frame and may include one or more groups of pixels in the frame. If the pixel is in the area of interest, flow proceeds to block 1206; otherwise, flow proceeds back to block 1203.

Blocks 1206 through 1210 perform the labeling of the pixel in a manner similar to those in the other previous embodiments. In block 1206, if the value of the intensity of the pixel is close enough to the mean for the pixel in the background statistical model, the pixel is labeled as background in block 1209. In block 1207, if the value of the intensity of the pixel is further away from the mean for the pixel in the background statistical model, the pixel is labeled foreground in block 1210. In block 1208, if the value of the intensity of the pixel is far away from the mean for the pixel in the background statistical model, the pixel is labeled as definite foreground. After blocks 1208, 1209, and 1210, flow proceeds back to block 1203.

Mathematically, blocks 1206 through 1210 may be summarized as follows. For blocks 1206 and 1209, if $$|i(x)-\bar{i}(x)|<T_1\sigma(x),$$

label pixel $i(x)$ as background, where $i(x)$ is the pixel intensity at location x, $\bar{i}(x)$ is the mean of the background statistical model mean at location x, $T_i$ is a threshold, and $\sigma(x)$ is the standard deviation of the background statistical model at location x. For blocks 1207 and 1210, if $$T_1\sigma(x) \leq |i(x)-\bar{i}(x)| < T_2\sigma(x),$$

label pixel $i(x)$ as foreground, where T2 is a threshold higher than T1. For blocks 1207 and 1208, if $$|i(x)-\bar{i}(x)| \geq T_2\sigma(x),$$

label pixel $i(x)$ as definite foreground.

Figure 13:
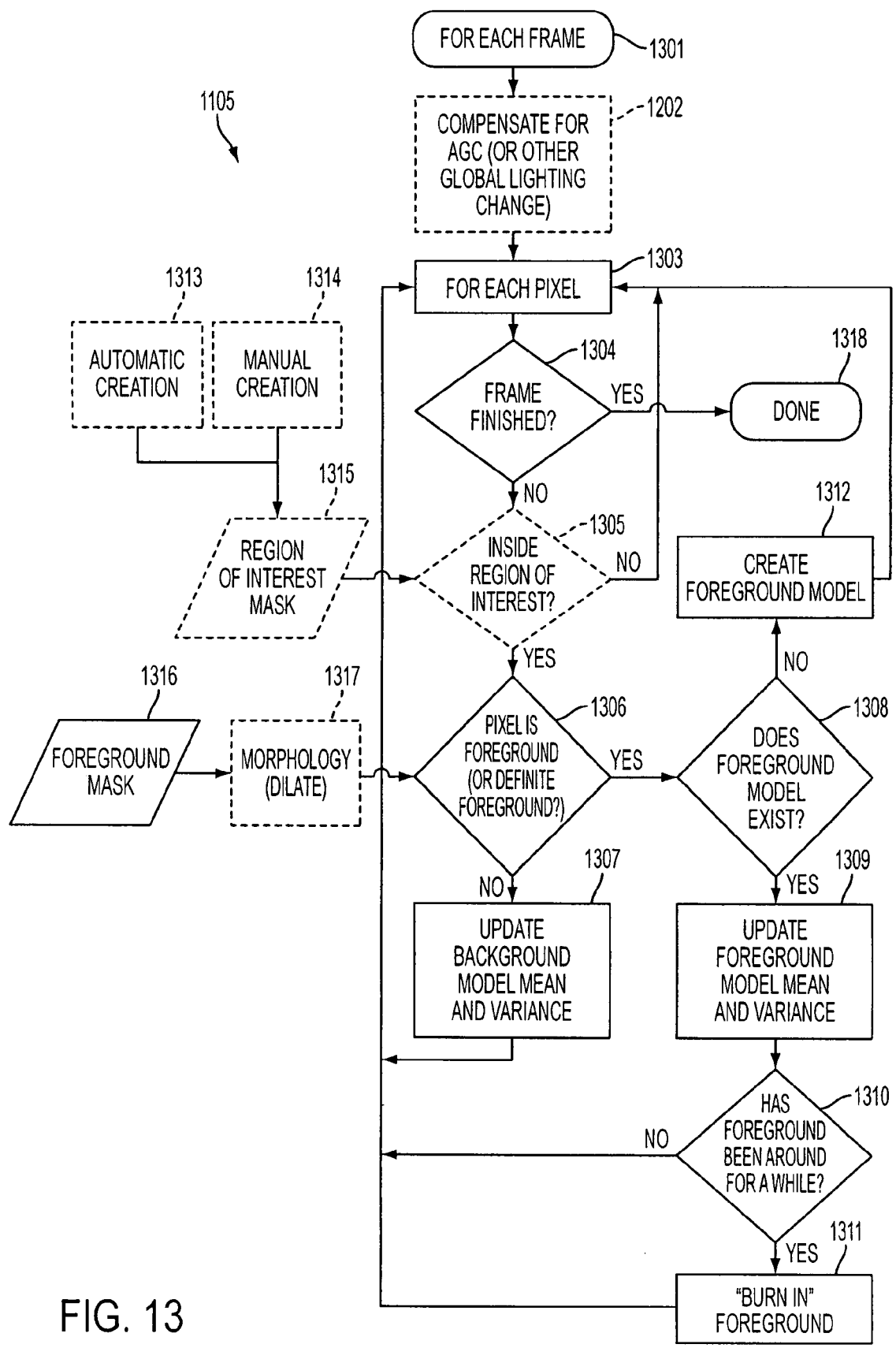
FIG. 13 shows a flowchart corresponding to an implementation of one of the blocks in the flowchart of FIG. 11.

FIG. 13 illustrates a flowchart for block 1105 of FIG. 11. In block 1301, each frame is processed accordingly.

In optional block 1202, compensation for AGC (or other global lighting change) is performed.

In block 1303, each pixel in the frame is processed accordingly.

In block 1304, if each pixel in the frame has been analyzed, flow proceeds to block 1318; otherwise, flow proceeds to block 1305.

In optional block 1305, it is determined whether a pixel is in the area of interest or not. Pixels inside the area of interest are labeled, while pixels outside the area of interest are not labeled. The determination of whether a pixel is inside the area of interest may be performed with a mask (from optional block 1313) or any other such mechanism. The mask may be generated manually (as in optional block 1313), or by an automatic process that determines where the area of interest might be within a frame (as in optional block 1311). The area of interest may be continuous or discontinuous across frame and may include one or more groups of pixels in the frame. If the pixel is in the area of interest, flow proceeds to block 1306; otherwise, flow proceeds back to block 1303.

Next, the foreground mask that was generated in blocks 1103, 8, and 1104 in FIG. 11 is used as a filter to update the background and foreground statistical models. In block 1316, the foreground mask is obtained.

In optional block 1317, the foreground mask may be filtered by some morphology, such as dilation, to make sure that pixels on the edge of foreground objects do not corrupt the background model.

In block 1306, if the pixel is not a foreground or definite foreground pixel, flow proceeds to block 1307; otherwise flow proceeds to block 1308.

In block 1307, the mean and variance of the background statistical model are be updated with the information from the current frame at that pixel location. If the background statistical model does not yet exist, the background statistical model may be built based on the discussions in the previous embodiments.

In block 1308, the pixel is a foreground or definite foreground pixel. If a foreground model exists, flow processed to block 1309; otherwise flow proceeds to block 1312.

In block 1312, a foreground statistical model does not exist at the location of the pixel, and a new foreground statistical model is created. The model is of the form $\bar{i}_f(x)=i(x); \sigma_f(x)=D$, where $\bar{i}_f(x)$ represents the mean of the foreground statistical model at pixel location x, $\sigma_f(x)$ represents the standard deviation of the foreground statistical model at pixel location x, and D is a default value.

In block 1309, the foreground statistical model exist at this location and is updated with the data from the current pixel.

In block 1310, if the pixel has been in a foreground state for a long period of time, flow proceeds to block 1311; otherwise, flow proceeds to block 1303.

In block 1311, the pixel has been in a foreground state for a long period of time and may begin to be considered as background. This shift in segmentation is accomplished by replacing the background model with the foreground model at this location:

$$\bar{i}(x)=\bar{i}_f(x); \sigma(x)=\sigma_f(x).$$

In the fourth embodiment, unlike the previous three embodiments, the updating of the background and foreground models in blocks 1307 and 1309 may be different. In the previous embodiments, a running mean and standard deviation are used. In the real-time case for this embodiment, where the background may be continually undergoing drastic change (e.g., as day becomes night, and vice versa), a running mean and standard deviation would provide statistical models that may never be accurate. In this real-time embodiment, the current mean and standard deviation should represent the background at the current time. Hence, more weight should be given to recent information than to old information. For this reason, a filter that considers previous statistical values, such as, for example, an infinite impulse response (IIR) filter, should be used to update the background and foreground models. The filter may be applied as follows:

$$\bar{i}(x)=(1-\alpha)i(x)+\alpha\bar{i}(x)$$

$$\sigma(x)=(1-\alpha)(|i(x)-\bar{i}(x)|)+\alpha\sigma(x)$$

where $\alpha$ is a blending constant. The blending constant $\alpha$ may be mapped to a standard blending time constant.

Figure 14:
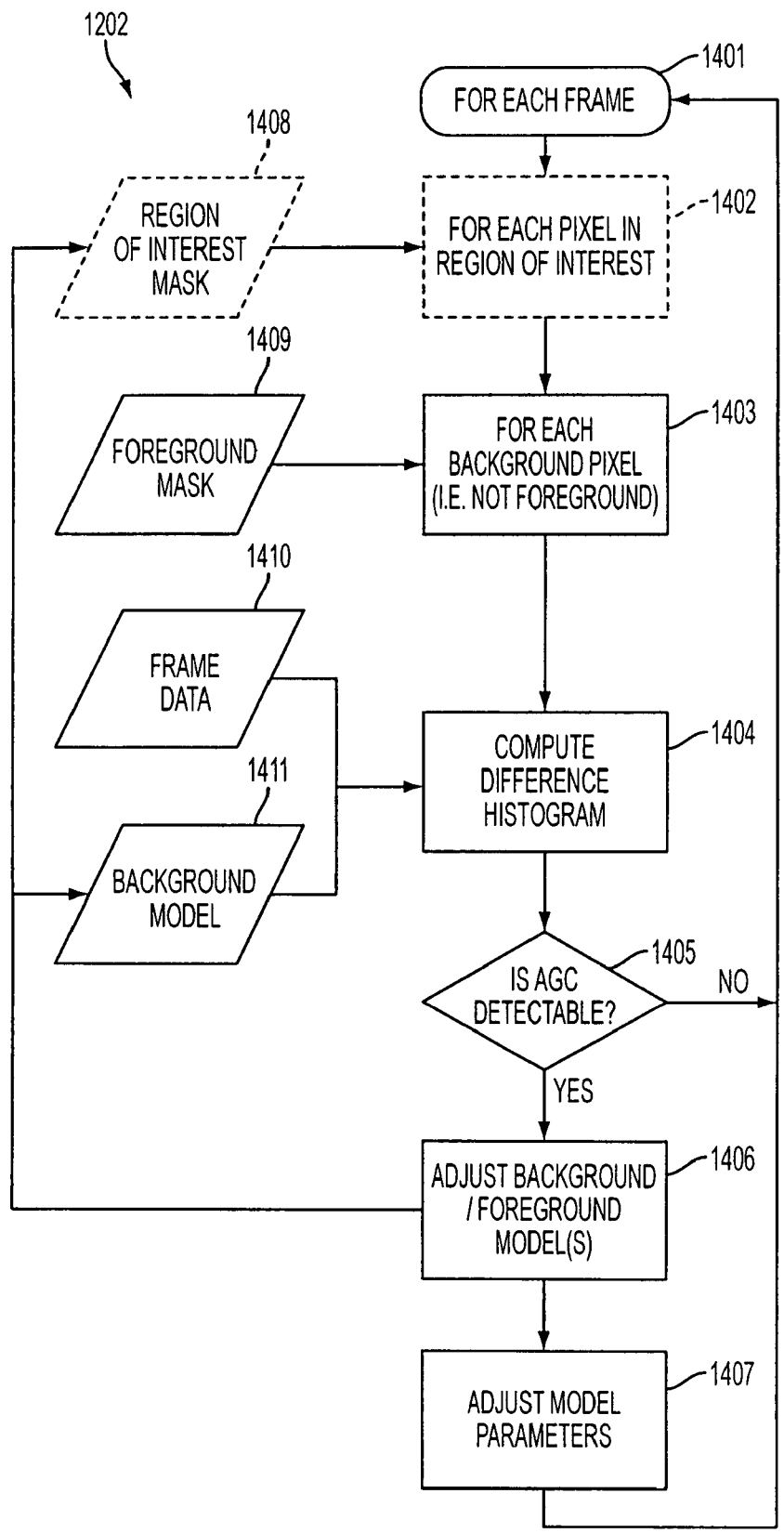
FIG. 14 shows a flowchart corresponding to an implementation of one of the blocks in the flowchart of FIGS. 12 and 13.
Figure 15:
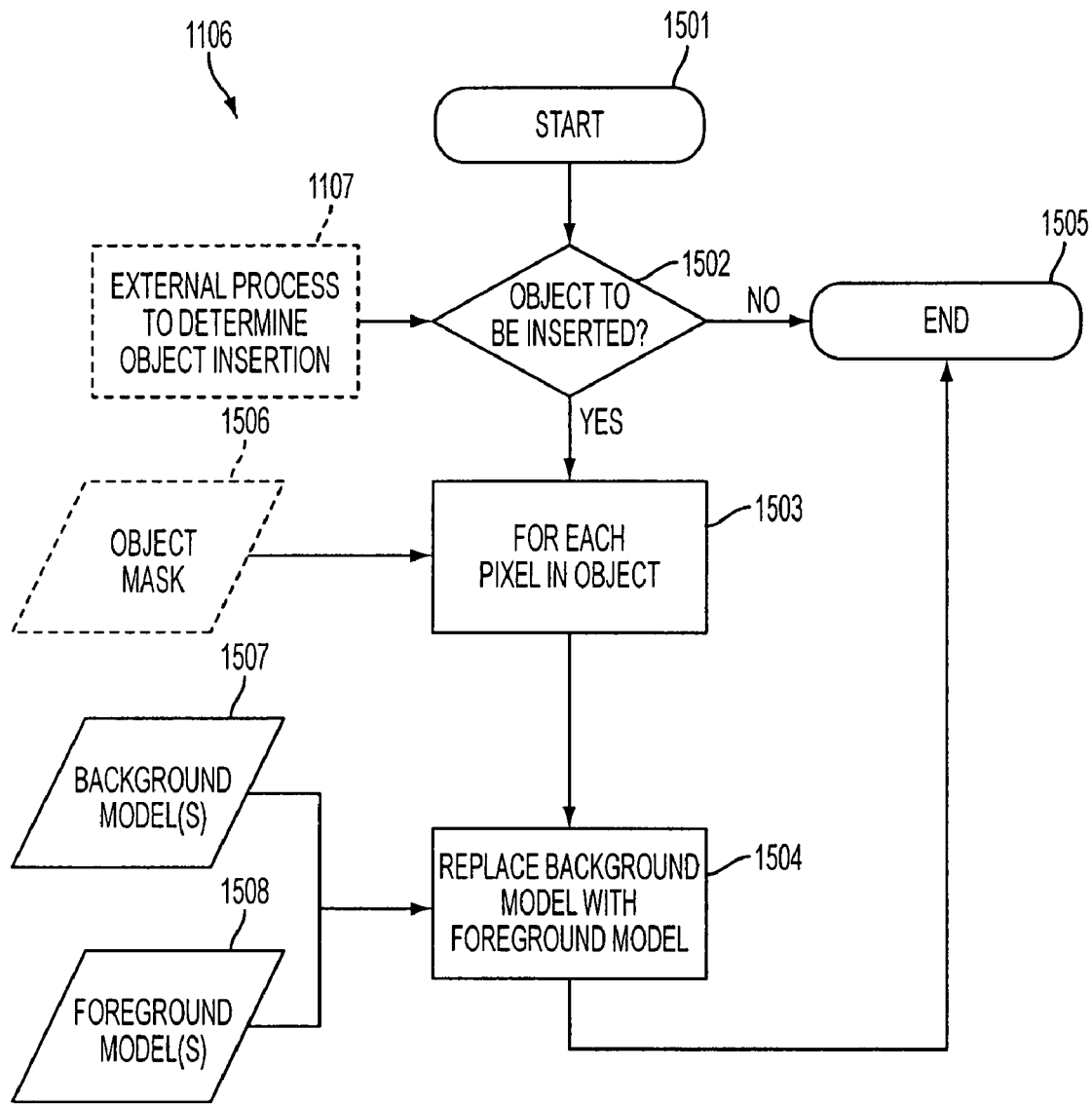
FIG. 15 shows a flowchart corresponding to an implementation of one of the blocks in the flowchart of FIG. 11.

FIG. 14 illustrates a flowchart for block 1202 of FIGS. 2 and 13. In block 1401, each frame is processed accordingly.

In optional block 1402, each pixel in the area of interest is processed accordingly. The area of interest may be provided by optional block 1408.

In block 1403, each background pixel is processed accordingly. The background pixels may be determined to be those that are not in a foreground mask provided by block 1409.

In block 1404, a difference histogram is generated between the background model from block 1411 and the current frame from block 1410. The difference histogram measures the amount of difference that exists between the background model and the current frame for each pixel intensity value in the background model. As an example, for pixels in the background model with intensity value 10, the average intensity difference between these pixels and their corresponding pixels in the current frame may be represented as 5 grey levels. For pixels with intensity value 100, the average difference may be 30 grey levels.

In block 1405, the frame is analyzed to detect any global AGC effects. The frame is analyzed by examining the average of the histogram values. If the histogram values are all quite low, this may mean that the background pixels basically agree with the current frame pixels, in terms of intensity. If the histogram values are all quite high, this may mean that there is, on average, a large difference in intensity between the current frame and the background model, and thus, there may be a global AGC effect (or a global lighting change) in the frame. If global AGC effects are detected in the frame, flow proceeds to block 1406; otherwise flow proceeds back to bloc 1401.

In block 1406, AGC effects are detected, and the background model is updated. The background model is updated by using the difference histogram from block 1404 as a lookup table. The mean value of each pixel in the background model is adjusted by the average difference between the current frame intensity data and the background model intensity data (for this value of background mean intensity). This update may be summarized as follows:

$$i(x)=H(i(x))+i(x),$$

where H(i) is the average intensity difference between pixels of intensity i in the background model and their corresponding pixels in the current frame.

In block 1407, the model parameters are adjusted due to the presence of AGC. For example, if AGC is detected, the blending constant α used for updating in blocks 1307 and 1309 in FIG. 13 may be decreased. By decreasing the blending constant α, more weight is given to data from the current frame so that when the background and foreground models are updated in blocks 1307 and 1309, respectively, the models update faster and are less sensitive to global intensity changes. When no AGC is detected, α is increased, which makes the model update process in blocks 1307 and 1309 more sensitive to intensity changes.

FIG. 5 illustrates a flowchart for block 1106 in FIG. 11. As an example, if objects are detected and tracked, and determined to be stationary (e.g., a car parking), it might be desirable to burn these objects into the background model so that the background model may continue to detect foreground in that region.

In block 1502, a determination is made whether to insert an object in the background model. As an option, an external process (from optional block 1107) may determine that an object should be inserted in the background model. If an object is to be inserted, flow proceeds to block 1503; otherwise, flow proceeds to block 1505 and ends.

In block 1503, for each pixel in the object, flow proceeds accordingly. The object may be described by an optional object mask (from optional block 1506) or any other mechanism.

In block 1504, for each pixel in the mask, the background model(s) at that location (from block 1507) are replaced by the foreground model(s) at that location (from block 1508) resulting in the entire object en masse being inserted in the background in one step.

5. Additional Embodiments and Remarks

While the above discussion considers two-level and three-level pixel labeling algorithms, this embodiment is not limited only to these cases. Indeed, it is contemplated that an arbitrary number of decision levels, corresponding to different ranges (i.e., threshold values) may be used. In such a case, fuzzy or soft-decision logic would be used to make decisions in subsequent steps of the segmentation process.

The above discussion primarily discusses pixels and chromatic values (which may be RGB, YUV, intensity, etc.); however, as discussed above, the invention is not limited to these quantities. Regions other than pixels may be used, and quantities other than chromatic values may be used.

Figure 9:
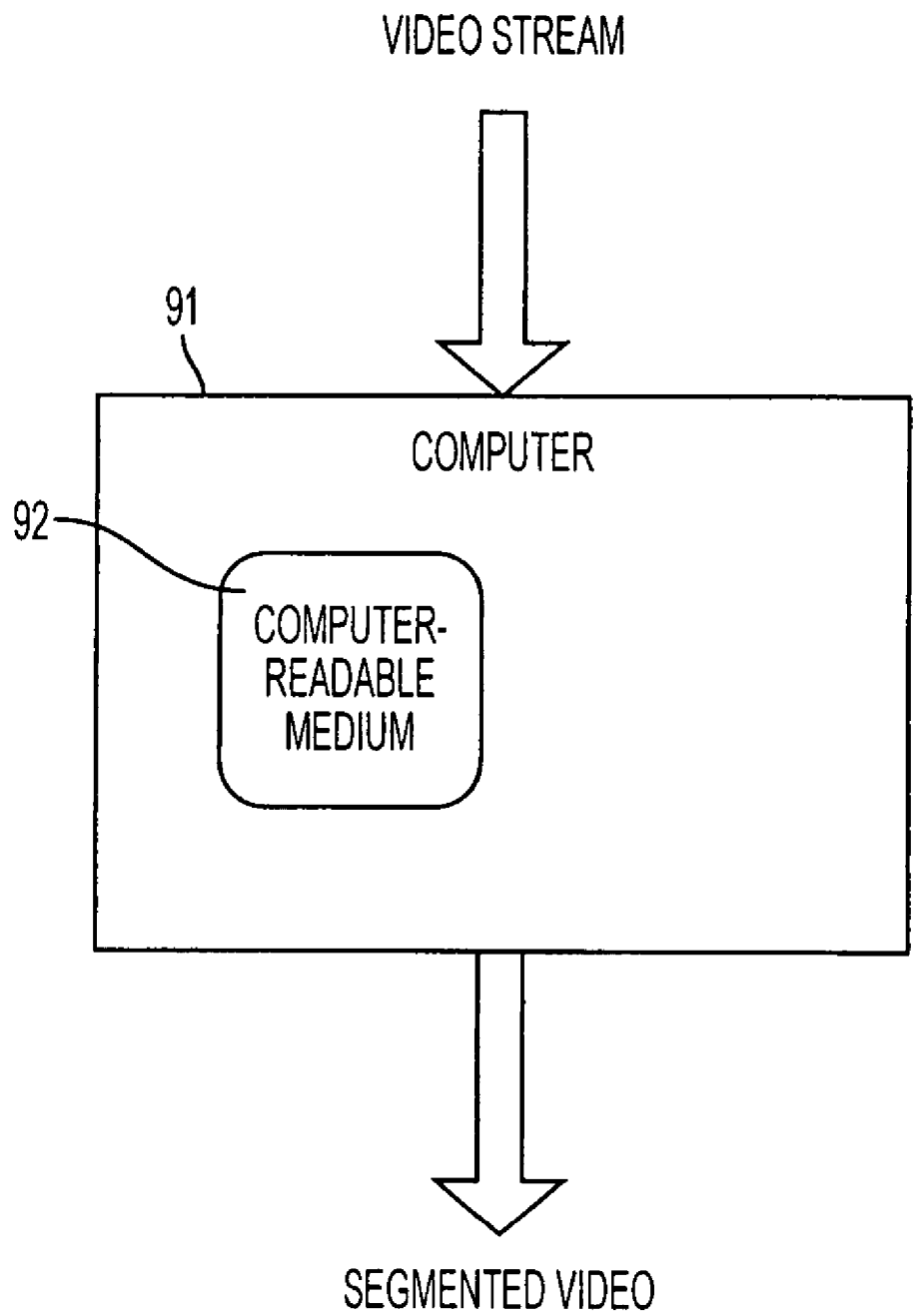
FIG. 9 depicts an embodiment of the invention in the form of software embodied on a computer-readable medium, which may be part of a computer system.

As discussed above, the invention, including all of the embodiments discussed in the preceding sections, maybe embodied in the form of a computer system or in the form of a computer-readable medium containing software implementing the invention. This is depicted in FIG. 9, which shows a plan view for a computer system for the invention. The computer 91 includes a computer-readable medium 92 embodying software for implementing the invention and/or software to operate the computer 91 in accordance with the invention. Computer 91 receives a video stream and outputs segmented video, as shown. Alternatively, the segmented video may be further processed within the computer.

In addition to implementing all of the embodiments described herein with a computer and software, all of the embodiments discussed herein may also be implemented in circuitry and/or hardware. The circuitry may include, for example: a field programmable gate array (FPGA), an application specific integrated circuit (ASIC), or a hardware accelerator on or coupled to a digital signal processor (DSP), a general-purpose preprocessor (GPP), or other processing device. The circuitry may be implemented, for example, with a chip, chips, and/or a chip set. The circuitry may be located, for example, on a printed circuit board, on an add-on card, and/or in an add-on slot. The circuitry may be located, for example, in a video camera, a video router, a video encoder, and/or a digital video recorder (DVR). Other circuit-based and/or hardware-based implementations will become apparent to those of ordinary skill in the art.

Figure 10:
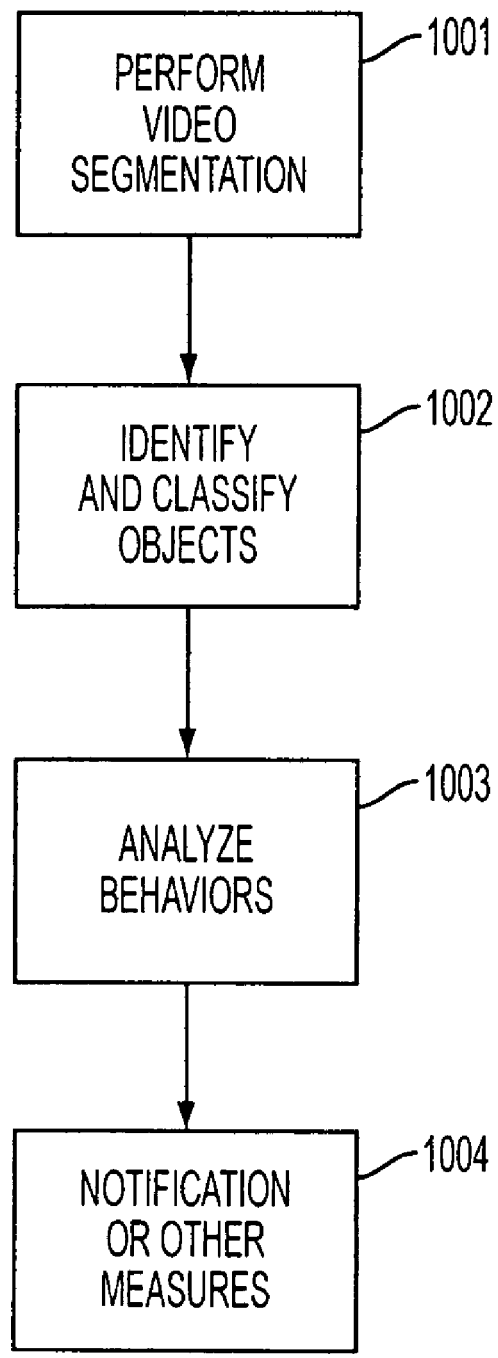
FIG. 10 depicts a flowchart of a method of implementing an intelligent video surveillance system according to an embodiment of the invention.

Also as discussed above, the statistical pixel modeling methods described above may be incorporated into a method of implementing an intelligent video surveillance system. FIG. 10 depicts an embodiment of such a method. In particular, block 1001 represents the use of statistical pixel modeling, e.g., as described above. Once the statistical pixel modeling has been completed, block 1002 uses the results to identify and classify objects. Block 1002 may use, for example, statistical or template-oriented methods for performing such identification and classification. In performing identification and classification, it is determined whether or not a given object is an object of interest; for example, one may be interested in tracking the movements of people through an area under surveillance, which would make people "objects of interest." In Block 1003, behaviors of objects of interest are analyzed; for example, it may be determined if a person has entered a restricted area. Finally, in Block 1004, if desired, various notifications may be sent out or other appropriate actions taken.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

We claim:

1. Circuitry adapted to perform a one-pass video segmentation for differentiating between foreground and background portions of video, the circuitry comprising:
   circuitry to obtain a frame sequence from a video stream; and
   for each frame in the frame sequence:
      circuitry to align the frame with a scene model;
      circuitry to build a background statistical model, the background statistical model comprising values corresponding to regions of frames of the frame sequence and variances for the regions;
      circuitry to label the regions of the frame; and
      circuitry to perform spatial or temporal filtering.

2. A one-pass method of video segmentation, for differentiating between foreground and background portions of video, comprising the steps of:
   obtaining a real-time video stream; and
   for each frame in the real-time frame stream, performing the following steps:
      labeling pixels in the frame;
      performing spatial or temporal filtering;
      updating a background statistical model, after the pixels are labeled; and
      at least one of building or updating at least one foreground statistical model, after the pixels are labeled.

3. A method according to claim 2, wherein for each frame in the real-time frame stream, further performing the following step:
   inserting an object into the background statistical model.

4. A method according to claim 2, wherein labeling pixels in the frame comprises:
   compensating for global lighting change to the frame.

5. A method according to claim 2, wherein updating the background statistical model and the foreground statistical model comprises:
   compensating for global lighting change to the frame.

6. A method according to claim 2, wherein pixels are labeled in the frame for an area of interest in the frame.

7. A method according to claim 2, further comprising:
   at least one of building or updating the background statistical model and the foreground statistical model pixels for an area of interest in the frame.

8. A method according to claim 2, further comprising:
   updating the background statistical model based on an infinite impulse response filter applied to previous statistical values of the background statistical model.

9. A method according to claim 2, further comprising:
   updating the foreground statistical model based on an infinite impulse response filter applied to previous statistical values of the foreground statistical model.

10. Circuitry adapted to perform a one-pass video segmentation for differentiating between foreground and background portions of video, comprising:
    circuitry to obtain a real-time video stream; and
    for each frame in the real-time frame stream:
       circuitry to label pixels in the frame;
       circuitry to perform spatial or temporal filtering;
       circuitry to update a background statistical model, after the pixels are labeled; and
       circuitry to at least one of build or update at least one foreground statistical model, after the pixels are labeled.

11. A circuitry according to claim 10, further comprising:
    for each frame in the real-time frame stream: circuitry to insert an object into the background statistical model.

12. A circuitry according to claim 10, wherein the circuitry to label pixels in the frame comprises:
    circuitry to compensate for global lighting change to the frame.

13. A circuitry according to claim 10, wherein at least one of the circuitries to update the background statistical model and the foreground statistical model comprises:
    circuitry to compensate for global lighting change to the frame.

14. A circuitry according to claim 10, wherein pixels are labeled in the frame for an area of interest in the frame.

15. A circuitry according to claim 10, wherein the background statistical model and the foreground statistical model pixels are built or updated for an area of interest in the frame.

16. A circuitry according to claim 10, further comprising:
    circuitry to update the background statistical model based on an infinite impulse response filter applied to previous statistical values of the background statistical model.

17. A circuitry according to claim 10, further comprising:
    circuitry to update the foreground statistical model based on an infinite impulse response filter applied to previous statistical values of the foreground statistical model.

18. A computer-readable medium comprising software for differentiating between foreground and background portions of video, the medium comprising:
    instructions for obtaining a real-time video stream; and
    for each frame in the real-time frame stream, instructions for:
       labeling pixels in the frame;
       performing spatial or temporal filtering;
       updating a background statistical model, after the pixels are labeled; and
       at least one of building or updating a foreground statistical model, after the pixels are labeled.

19. A computer-readable medium comprising software for differentiating between foreground and background portions of video, the medium comprising:
    instructions for obtaining a frame sequence from a video stream; and
    for each frame in the frame sequence, instructions for:
       aligning the frame with a scene model,
       building a background statistical model, the background statistical model comprising values corresponding to regions of frames of the frame sequence and variances for the regions,
       labeling the regions of the frame, and
       performing spatial or temporal filtering.

* * * * *

(12) INTER PARTES REEXAMINATION CERTIFICATE (543rd)
United States Patent
Lipton et al.

(10) Number: US 7,424,175 C1
(45) Certificate Issued: *Feb. 25, 2013

(54) VIDEO SEGMENTATION USING STATISTICAL PIXEL MODELING

(75) Inventors: Alan J. Lipton, Herndon, VA (US); Niels Haering, Reston, VA (US); Zeeshan Rasheed, Sterling, VA (US); Omar Javed, Herndon, VA (US); Zhong Zhang, Herndon, VA (US); Weihong Yin, Herndon, VA (US); Péter L. Venetianer, McLean, VA (US); Gary W. Myers, Aldie, VA (US)

(73) Assignee: ObjectVideo, Inc., Reston, VA (US)

Reexamination Request:
No. 95/001,997, May 25, 2012

Reexamination Certificate for:
Patent No.: 7,424,175
Issued: Sep. 9, 2008
Appl. No.: 11/711,063
Filed: Feb. 27, 2007

(*) Notice: This patent is subject to a terminal disclaimer.

Related U.S. Application Data

(63) Continuation-in-part of application No. 10/667,148, filed on Sep. 22, 2003, now Pat. No. 7,224,852, which is a continuation-in-part of application No. 09/815,385, filed on Mar. 23, 2001, now Pat. No. 6,625,310.

(60) Provisional application No. 60/792,313, filed on Apr. 17, 2006.

(51) Int. Cl.
G06K 9/32 (2006.01)
H04N 7/18 (2006.01)
G06K 9/36 (2006.01)

(52) U.S. Cl. .................................. 382/294; 375/240.11

(58) Field of Classification Search ........................ None
See application file for complete search history.

(56) References Cited

To view the complete listing of prior art documents cited during the proceeding for Reexamination Control Number 95/001,997, please refer to the USPTO's public Patent Application Information Retrieval (PAIR) system under the Display References tab.

*Primary Examiner* — Salman Ahmed

(57) ABSTRACT

A method for segmenting video data into foreground and background portions utilizes statistical modeling of the pixels. A statistical model of the background is built for each pixel, and each pixel in an incoming video frame is compared with the background statistical model for that pixel. Pixels are determined to be foreground or background based on the comparisons. The method for segmenting video data may be further incorporated into a method for implementing an intelligent video surveillance system. The method for segmenting video data may be implemented in hardware.

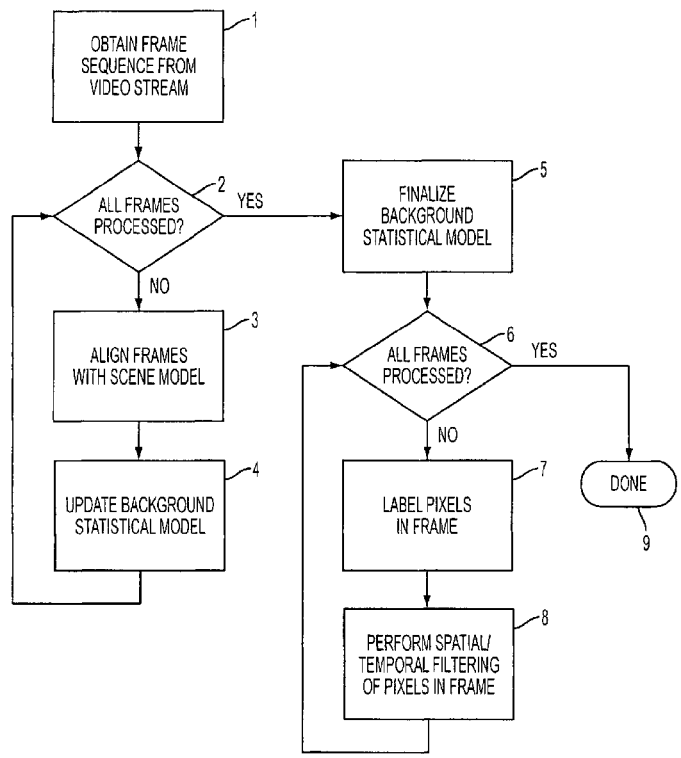

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 2, 3, 8-11 and 16-18 are cancelled.

Claims 1, 4-7, 12-15 and 19 were not reexamined.

\* \* \* \* \*